(12) United States Patent
Journeau et al.

(10) Patent No.: US 9,256,909 B2
(45) Date of Patent: Feb. 9, 2016

(54) SCIENTIFIC INFORMATION MANAGEMENT METHOD

(75) Inventors: Philippe François Journeau, Issy les Moulineaux (FR); Loïc Marie Tron, Paris (FR); Hugues Journeau, Parmain (FR)

(73) Assignee: RE-VUER, CO., Ocean City, MD (US)

( * ) Notice: Subject to any disclaimer, the term of this patent is extended or adjusted under 35 U.S.C. 154(b) by 0 days.

(21) Appl. No.: 13/262,254

(22) PCT Filed: Mar. 30, 2010

(86) PCT No.: PCT/IB2010/000720
§ 371 (c)(1),
(2), (4) Date: Sep. 30, 2011

(87) PCT Pub. No.: WO2010/113017
PCT Pub. Date: Oct. 7, 2010

(65) Prior Publication Data
US 2012/0023218 A1    Jan. 26, 2012

Related U.S. Application Data

(60) Provisional application No. 61/164,674, filed on Mar. 30, 2009.

(51) Int. Cl.
*G06F 15/173*    (2006.01)
*G06Q 50/20*    (2012.01)
*G06Q 10/06*    (2012.01)

(52) U.S. Cl.
CPC ............... *G06Q 50/20* (2013.01); *G06Q 10/06* (2013.01)

(58) Field of Classification Search
CPC ... G06F 3/048; H04L 29/08072; H04L 29/06; H04L 41/0213
USPC .................................. 709/223, 224, 225, 226
See application file for complete search history.

(56) References Cited

U.S. PATENT DOCUMENTS 6,636,898 B1 * 10/2003 Ludovici ............. H04L 63/0272
709/227
6,885,901 B2 * 4/2005 Tomii ................. G06Q 10/0875
700/100

(Continued)

OTHER PUBLICATIONS

International Search Report issued Oct. 18, 2010 by European Patent Office re: PCT/IB2010/000720; citing: M. Ohira et al.
Masao Ohira et al. "Empirical Project Monitor: A Tool for Mining Multiple Project Data", Proc. of International Workshop on Mining Software Repositories (MSR2004) May 2004; pp. 42-46, XP002602561, htt://msr.uwaterloo.ca/papers/Ohira.pdf; Edinburgh, Scotland, UK.

*Primary Examiner* — Dhairya A Patel
(74) *Attorney, Agent, or Firm* — Cantor Colburn LLP

(57) ABSTRACT

A scientific information management system is provided. It comprises a server, and at least one content server connected to the registration server to provide networking services to a plurality of users through a network, said at least one content server comprising data comprising scientific information of experimental research projects, wherein said system comprises: —a plurality of user interfaces, at least one of them comprising means for submitting data comprising first scientific information together with a status identifying the degree of accomplishment of said project; —a data processor connected to said plurality of user interfaces, said data processor being capable of processing said data retrieved from said at least one content server to generate at least one representation of the relative position of said first scientific information compared to others scientific information and the status of said first scientific information and display said representation on the user interface.

16 Claims, 25 Drawing Sheets

(56) References Cited

U.S. PATENT DOCUMENTS

| | | | |
|---|---|---|---|
| 7,401,057 B2 * | 7/2008 | Eder | G06N 5/022 |
| | | | 706/20 |
| 7,734,775 B2 * | 6/2010 | Barnett | G06F 11/3495 |
| | | | 703/14 |
| 2002/0062367 A1 * | 5/2002 | Debber | G06Q 10/06 |
| | | | 709/224 |
| 2002/0188665 A1 * | 12/2002 | Lash | G06F 17/30902 |
| | | | 709/203 |
| 2007/0067252 A1 * | 3/2007 | Hengerer | G06F 19/321 |
| 2009/0222508 A1 * | 9/2009 | Hubbard | G06Q 30/02 |
| | | | 709/202 |

* cited by examiner

Fig. 5

Fig. 8 xDisciNet
interDisciplinary Networking

My Clusters & Projects

Loïc TRON | Logout

*In order to help you, the edition of a project has been organized like a classic publication template. Only the Abstract level is mandatory. The Concept Proofing level is where the future or past results of experiments are filed in and linked to one or more clusters, in order to be visualized in the Cluster Display.*

- Project management
  - Control of the carbon shell
    - Abstract
    - Basic description / paper
    - Concept proofing / experiments
      - Sn70Ge30@carbon core-shell nanoparticles
        - Title
        - Description
        - Design
        - Results
        - New experiment
      - ☐
        - Versions
        - Clusters
      - New project
  - Cluster management
    - New cluster

Sn70Ge30@carbon core-shell nanoparticles [I]
(Dated: July, 31 2008) [I]

Description [I]

Design [I]

Electrochemical characterization of Sn70Ge30@carbon core-shell nanoparticles

Results: 1040 A.h/kg, 40 cycles [I]

Modification: Sep 04 2009 11:34:49

Creation: September, 4 2009 11:34:13

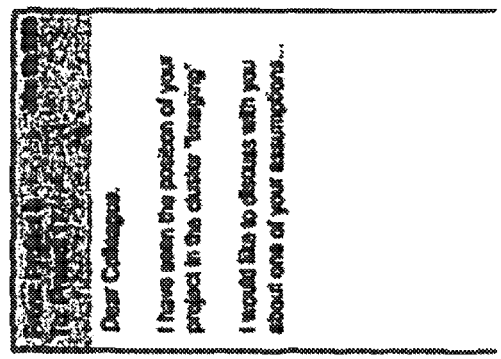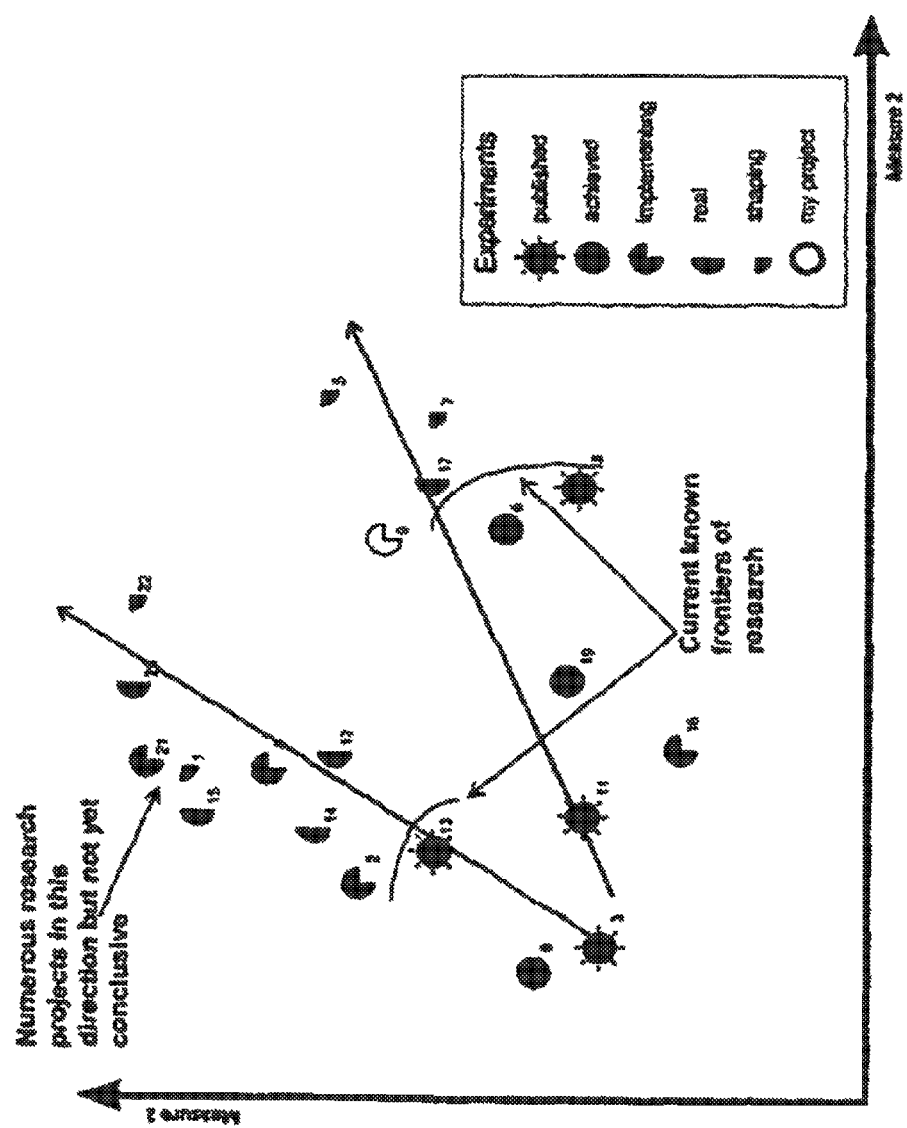
Fig. 18

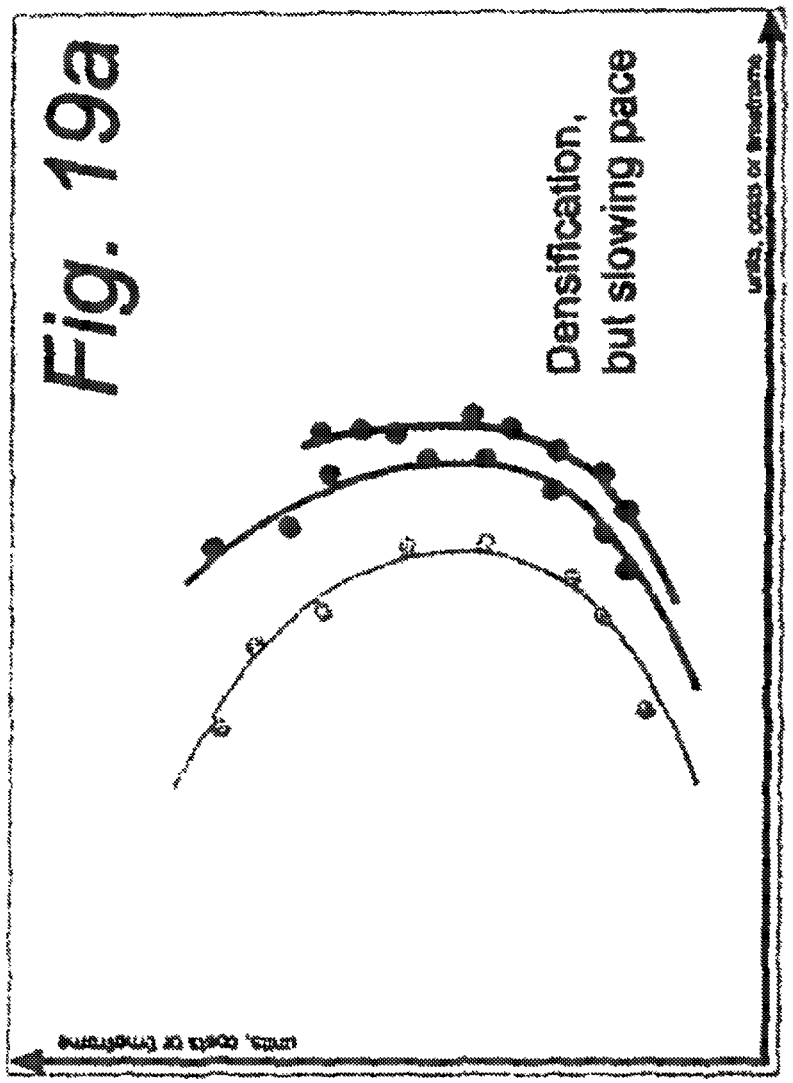

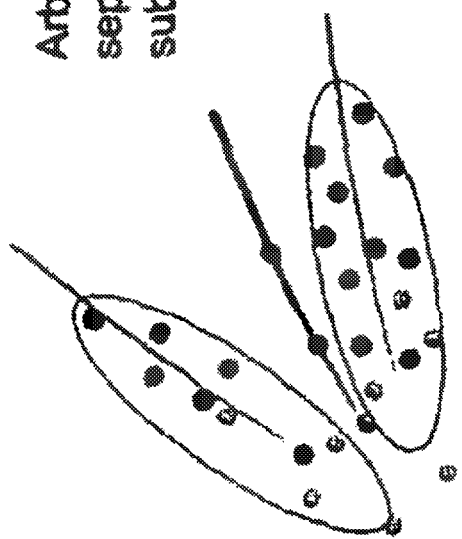

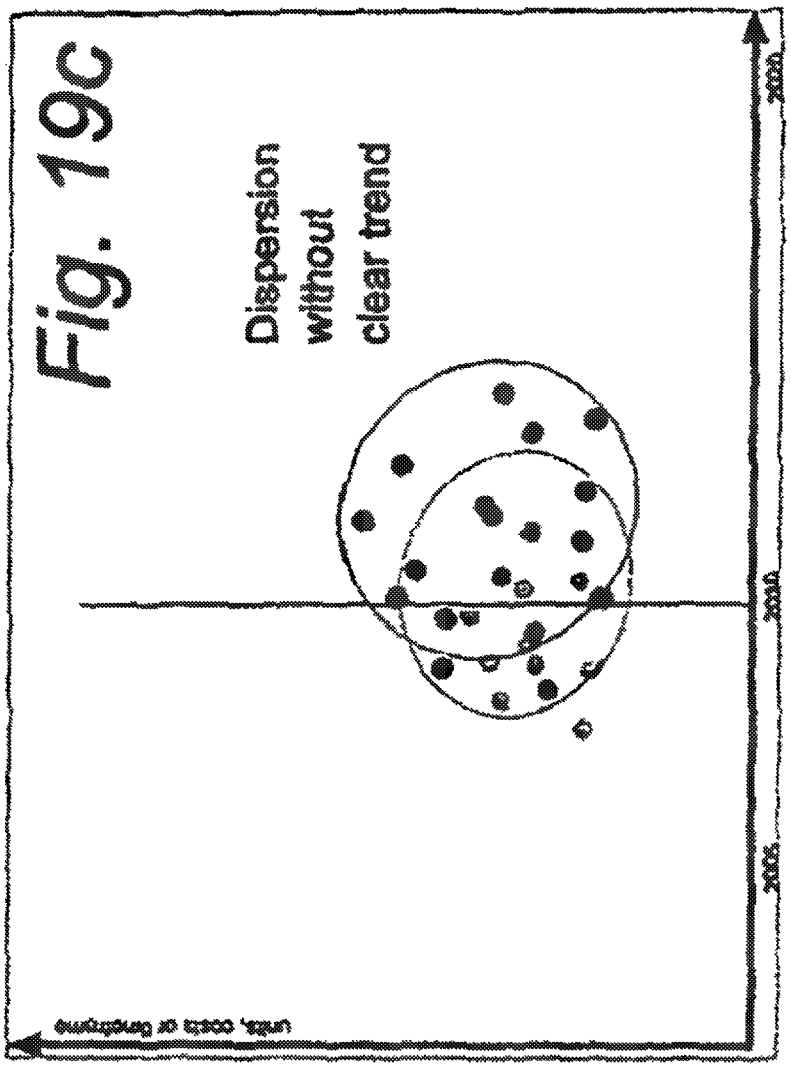

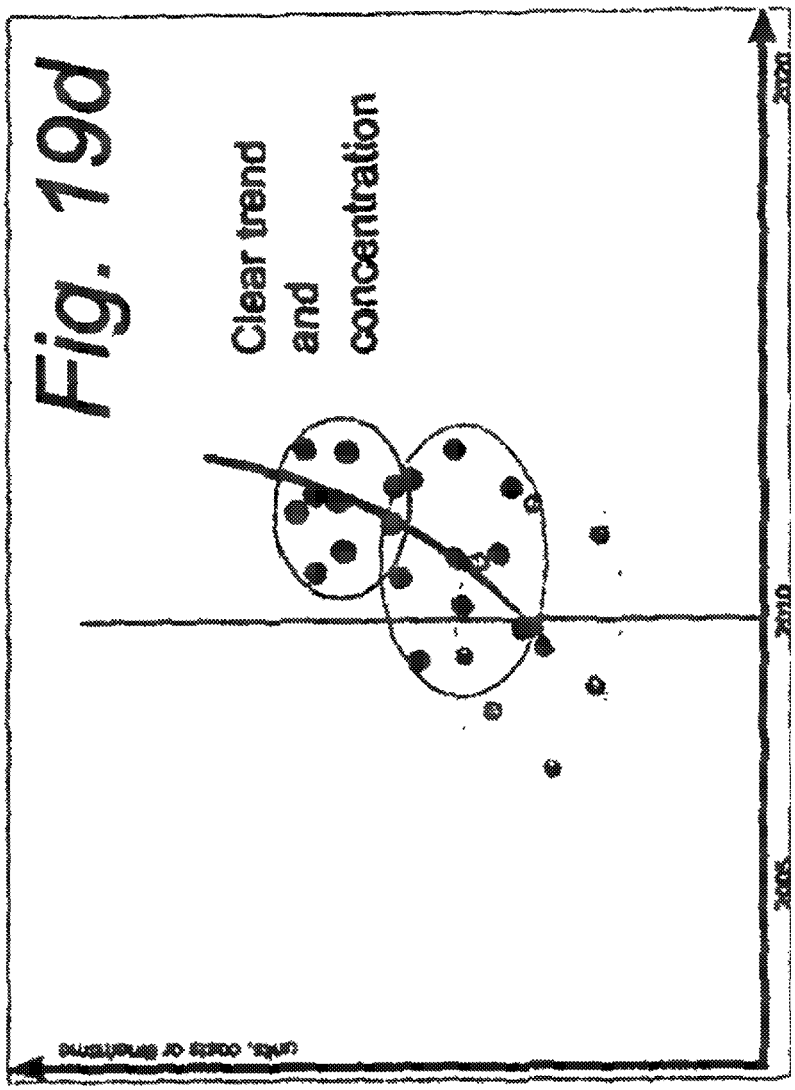

SCIENTIFIC INFORMATION MANAGEMENT METHOD

FIELD OF THE INVENTION

The invention relates to a scientific information management network-based method for performing research storing, sharing and processing a large number of experimental research projects from a network of scientists, as well as a scientific information management network based system to implement such a method.

BACKGROUND OF THE INVENTION

Experimental research projects are defined by one or several experiments which have to involve one to many time-related measurements in order to yield a consistent set of results, for instance by mere repetition, with or without changing one or several parameters or with different measurement instruments available.

It is customary to compare these experiments with set of experiments from several scientists and/or scientific institutions elaborated towards a similar goal.

Review of these set of experiments from several scientists, or related application reference material is necessary to validate or optimize and settle a definite norm and/or model and/or design from an experimental research project.

However, it is a time consuming step in the experimental research project process.

Consequently, scientists and scientific institutions have developed computer based systems and methods which provide capabilities for accessing a variety of research databases, each of which containing a wide range of information sources, such as scientific publications.

For example, the database may be a database storing the papers published in a Journal, in free or pay access.

With these types of databases, a scientist looking for specific information has to select a Journal for finding the relevant information. It may be sufficient when the information he wants is specific to one field of research. But, it is not always the case.

For example, when a researcher is looking for a solution to a specific problem, similar problems may have found a solution in other fields of research.

One understands that this type of databases gives few chances to access to this information.

Moreover, many fields of research nowadays combine several disciplines.

So, recently, diverse online databases have emerged to disseminate scientific information non-limited to a specific field of research.

Generally, the content of these databases is limited to information ever published such as papers, conferences, thesis and so on.

These types of databases may be in a restricted access, for example when they depend of a research organism, or in open access to any person. For example, we can cite the open archive known to HAL meaning Hyper Articles in Line or the open archive known to arXchive.

With these databases, a user has to enter keywords to find relevant information. These keywords are not inherently limited to a field of research so that the database may return more information than when its content is limited to a Journal.

However, there are a number of drawbacks to these online databases. While these databases serve well in their role as a search engine, they lack many other desirable functions.

For instance, the ability to determine the importance of a particular paper based upon its comparison with the user's project is absent from the current databases.

This creates difficulty in determining which papers not to read and which should receive high priority. The time estimated to read all the published literature in the given field of the user's project is too long.

Moreover, in this explosion of number and divergence of research fields, each field tends to generate its own appropriate terms and then languages.

This highlights some misunderstanding between researchers that makes complex any link between researchers of different fields and tend to their divergence.

Moreover, the industry, but also researchers, based only on published results may have sometimes difficulties to anticipate, sufficiently cadrable, future scientific and technological yet probable.

As the amount of scientific information disseminated grows, scientists need fast and efficient tools to quickly assimilate new information, integrate it with pre-existing information, and judge the relevance of said information relative to their own project.

Scientists also need tools to easily share information about current research. For example, in current computer-based systems or methods, the ability to analyze and discuss about the issues encountered in the formulation of an experimental protocol, the design of the experimental set-up or the relevance of experimental results with other researchers is absent.

OBJECTS AND SUMMARY OF THE INVENTION

Accordingly, it is an object of the invention to provide a system and a method to improve scientific information management in a computer-based environment.

It is another object of the invention to provide a system and a method to accelerate the speed of research while expanding the amount of information available to users.

It is still another object of the invention to provide a system and a method to store, share, compare and analyze current experimental research project with other ones, even projects in their infancy, obtain financing, market place and partnership opportunities across a large number of experimental research projects from different assays, data types and so on.

It is yet another object of the invention to provide a system and a method allowing users to evaluate their research project relative to others in order to make well informed decisions in the development of it and maybe find unexpected trends.

It is another object of the invention to provide a system and a method to provide an interdisciplinary interactive network of research projects authors from diverse fields of research.

These and other objects of the present invention are achieved by providing a scientific information management method implemented in a system comprising a server, and at least one content server connected to the server to provide networking services to a plurality of users interfaces through a network, said at least one content server comprising data including scientific information of experimental research projects, wherein the method comprises the following steps:
  (a) submitting data comprising first scientific information to said at least one content server, said first scientific information being input together with a status identifying the degree of accomplishment of the experimental research project;
  (b) retrieving said data from said at least one content server to be processed for generating at least one representation of the relative position of said first scientific information compared to other scientific information and the status of said first scientific information;

(c) transmitting said representation from said at least one content server to at least one user interface to display it on the user interface.

Particular implementations of the invention can include one or more of the following features:

said scientific information comprises at least one measurement unit, or at least one dimension;

said status is chosen among a discrete series of available statuses;

said status is chosen among one of the following statuses:

shaping when said scientific information to be transmitted to said at least one content server relates to an experimental protocol that has been formulated but not yet designed;

real when said scientific information to be transmitted to said at least one content server relates to an experimental protocol that has been formulated and yet designed;

implementing when said scientific information to be transmitted to said at least one content server relates to an experimental set-up aiming at implementing an experimental protocol is available;

achieved when said scientific information to be transmitted to said at least one content server relates to experimental data issued from an experimental set-up; or published when said scientific information to be transmitted to said at least one content server relates to experimental data than have ever been published.

step (a) comprises a substep consisting of inputting a piece of information concerning a cluster to which said first scientific information is to be related, said cluster being defined by a set of scientific information recognized by the users as targeting a common objective goal whatever the status of said scientific information;

said cluster is chosen among a plurality of existing clusters;

step (a) comprises a substep consisting of creating a new cluster to which said first scientific information shall be associated with, a cluster being defined by a set of scientific information recognized as targeting a common objective goal by the users, whatever the status of these scientific information;

step (a) comprises a substep consisting of inputting a computer program to be processed by the server during step (b) in order to output selected data from said at least one content server;

said computer program aims at selecting at least one of the following outputs from said at least one content server which has to be transmitted to the user during step (c), or a combination thereof:

an existence of experimental protocols, experimental set-ups or experimental data of the same type;

a set of scientific information recognized as targeting a common objective goal by the users whatever the status of these scientific information or a subset of these scientific information;

scientific information having a status of the same type;

the evolution over time of the relative position of said first scientific information compared to others scientific information;

an evolution over time of the relative position of said first scientific information compared to others scientific information and the evolution of their statuses;

a set of scientific information from crosslinked clusters whatever the status of these scientific information or, a subset of these scientific information, as a cluster is defined by a set of scientific information recognized as targeting a common objective goal by the users, whatever the status of these scientific information.

an evolution over time of crosslinked clusters.

step (a) is made by the user or in some cases, automatically;

step (b) comprises a substep consisting of updating the scientific information available as soon as new scientific information related to previously scientific information represented is transmitted;

step (b) comprises a substep consisting of generating a representation of the evolution over time of the scientific information and/or statuses transmitted by the users in a cluster;

said evolution relates to one of a displacement of the positioning of said scientific information in the representation;

step (b) comprises a substep consisting of generating a representation of the evolution over time of related clusters.

These and other objects of the present invention are achieved by providing also a scientific information management system comprising a server, and at least one content server connected to the registration server to provide networking services to a plurality of users through a network, said at least one content server comprising data comprising scientific information of experimental research projects, wherein said system comprises:

a plurality of user interfaces, at least one of them comprising means for submitting data comprising first scientific information together with a status identifying the degree of accomplishment of said project;

a data processor connected to said plurality of user interfaces, said data processor being capable of processing said data retrieved from said at least one content server to generate at least one representation of the relative position of said first scientific information compared to other scientific information and the status of said first scientific information and display said representation on the user interface.

Particular implementations of the invention can include one or more of the following features:

said at least one content server is separated into clusters, a cluster being defined by a set of scientific information recognized by the users as targeting a similar goal whatever the status of said scientific information;

said scientific information comprises at least one measurement unit, or at least one dimension;

said status is chosen among a discrete series of available statuses said status is chosen among one of the following statuses:

shaping when said scientific information to be transmitted to said at least one content server relates to the design of an experimental protocol that has been formulated but not yet designed;

real when said scientific information to be transmitted to said at least one content server relates to an experimental protocol that has been formulated and yet designed;

implementing when said scientific information to be transmitted to said at least one content server relates to an experimental set-up aiming at implementing an experimental protocol is available;

achieved when the scientific information to be transmitted to said at least one content server relates to experimental data issued from an experimental set-up; or published when the scientific information to be transmitted to said at least one content server relates to experimental data than have ever been published.

said user interfaces are computer-based systems connected to instrumentation device to provide scientific information automatically.

BRIEF DESCRIPTION OF THE DRAWINGS

The accompanying drawings, which are incorporated into and constitute part of this specification, illustrate one or more embodiments of the present invention and, together with the detailed description, serve to explain the principles and implementations of the invention.

In the drawings:

FIG. 5 shows a sample of a detailed experimental research project which is registered;

FIG. 8 is a screenshot of a detailed description of an experimental research project entry form page;

FIG. 11 shows a sample of results of the experimental research project registered in FIG. 5;

FIG. 13 is a sample of a cluster for the experimental research project registered in FIG. 4;

FIG. 15 to FIG. 18 illustrate different projections of relative positioning of experimental research projects with their status;

FIGS. 19a to 19d illustrate representation of a movement of a cluster over a time period;

DETAILED DESCRIPTION

The present invention provides a scientific information management network-based system and method enabling users, e.g. scientists, universities, industry, libraries, students, among others, to store, share, compare and analyze their experimental research project with others, obtain financing, market place and partnership opportunities across a large number of experimental research projects from different assays, data types and so on.

Figure 1:
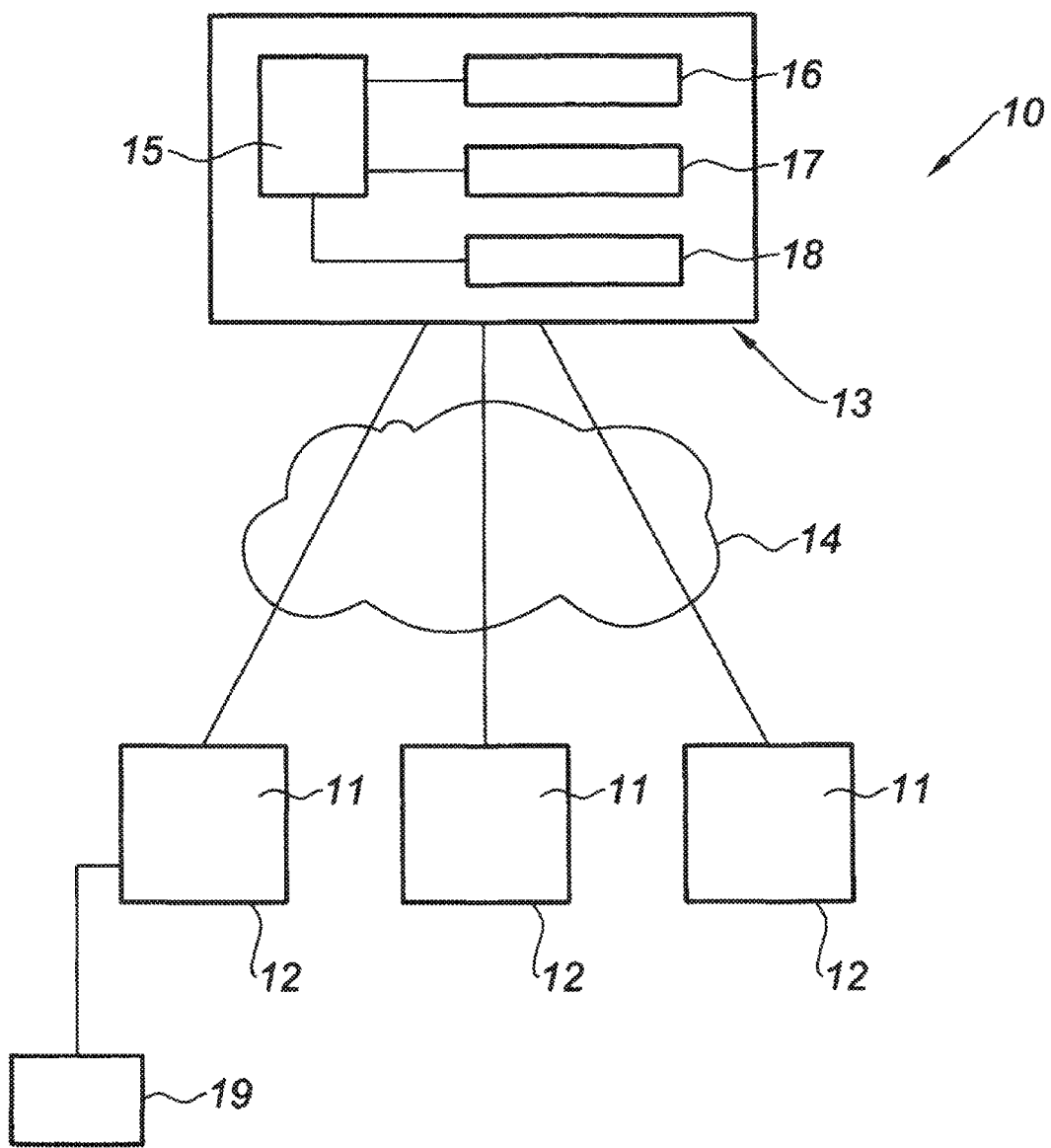
FIG. 1 is a simplified block diagram illustrating a system according to the invention.

The general architecture of a system that operates in accordance with one embodiment of the present invention is illustrated in FIG. 1. More information about the functions of the different components of the system will be described in connection with the description of the FIG. 2 and the method described below.

The system 10 comprises a plurality of graphical user interface displays 11 presented on a plurality of user interface devices 12 connected to at least one server 13 through a communication infrastructure 14 including media such as the internet, the mobile phone network, cable or satellite network or private networks.

The user interface 12 may be any device capable of submitting and presenting data, including, but not limited to computers, cellular telephones, television sets or personal digital assistant.

One should understand by a user a semantic oracle, namely a human oracle who has the capacity to input either a predicted or observed result of an experimental research project.

A semantic oracle is known from the man skilled in the art and will not be described herewith.

The server 13 may provide different application services connected to the user interface device 12 and one or several content servers 15 connected to these application services to provide networking services to the user interface through the network.

So, a registration server 16 for new user and experimental research projects registration is provided. The registration server 16 receives experimental research projects data from users of the system 10 for storage.

The registration server 16 is connected to the content server 15 that may be used to store all of the data submitted to the system 10 and particularly experimental results derived from experiments of the experimental research projects.

According to various embodiments of the invention, the content server 15 includes user's data and experimental research project data with associated information about the degree of accomplishment of those features, as described later in the description.

The content server 15 may also include cluster data which contain experimental research project data related to one another in some way.

The content server 15 includes also metadata for organizing the data in a particular hierarchy or directory, including type attributes usable by a logic executed by a data processor 17 coupled with the content server 15.

According to various embodiments, other parts of the content servers 15 include a correlation table, which is a table that contains information about the correlation of experimental research project data relative to other experimental research project data or clusters.

The content server 15 may also contain the history of past interaction between a user and the server 13.

The data processor 17 performs different functions such as processing experimental research projects data to generate a representation of them to users of the system, as described below.

The data processor 17 retrieves also data from the content server 15 for presenting them to users depending on their relevance with a user's experimental research project data or depending on user queries, as will be explained below with the description of a method according to the invention.

The server 13 also provides and manages social networking interactions 18 for users, such as email services and online relationships development.

In a specific embodiment, the user interface device 12 may be directly coupled to a data acquisition system 19 or instrumentation device that captures data from experiments of experimental research project.

In accordance with the present invention, the components of the system 10, the method steps and/or the data structures may be implemented using various types of operating systems and/or computer programs.

The following scientific information management network-based method is implemented in the system 10.

Although the description of the scientific information management network-based method is presented as a logical sequence of navigational steps a user might take, it is not meant to represent the only such embodiment.

The first step the user would take in accessing the system is visiting, through the user interface, the system home page which is a web portal that gives user access to register himself and his experimental research project in the system.

Experimental research project may be any project meant to by some ones, with words and through experiments to which other people may associate them, using such words.

Experimental research projects may range from most conceptual to most material. Liberty, as in the second Critique of Kant or the concept of autonomy for a particle, but also discreteness, fuzziness, life, intentionality are among most conceptual research projects while water or battery cells seem more concrete.

Reference is now made to FIGS. 2, 3, 4, 6 and 8, which are exemplary parts of the registration page of a project proposed by the registration server 16 of the system 10. This page is generally the starting point for any user attempting to use the system 10 of the current invention.

Figure 4:
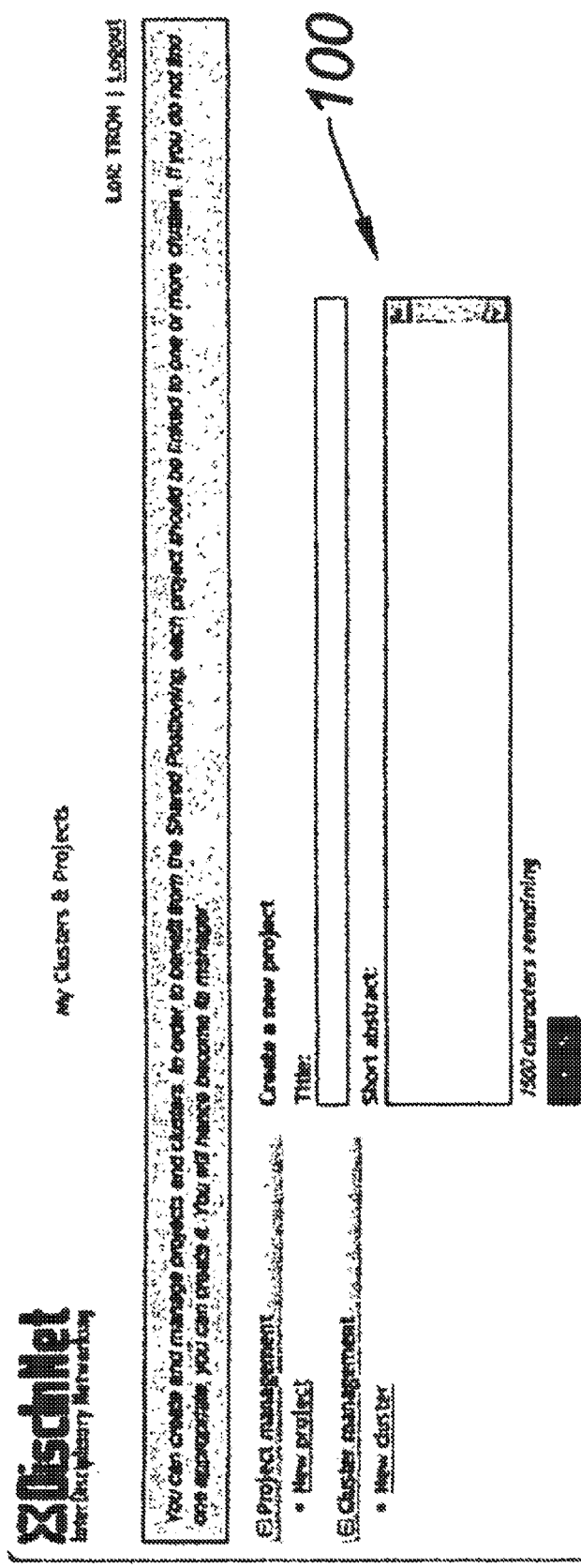
FIG. 4 is a screenshot of an abstract and title entry form page to fill in a registration home page in accordance with one embodiment of the present invention.
Figure 6:
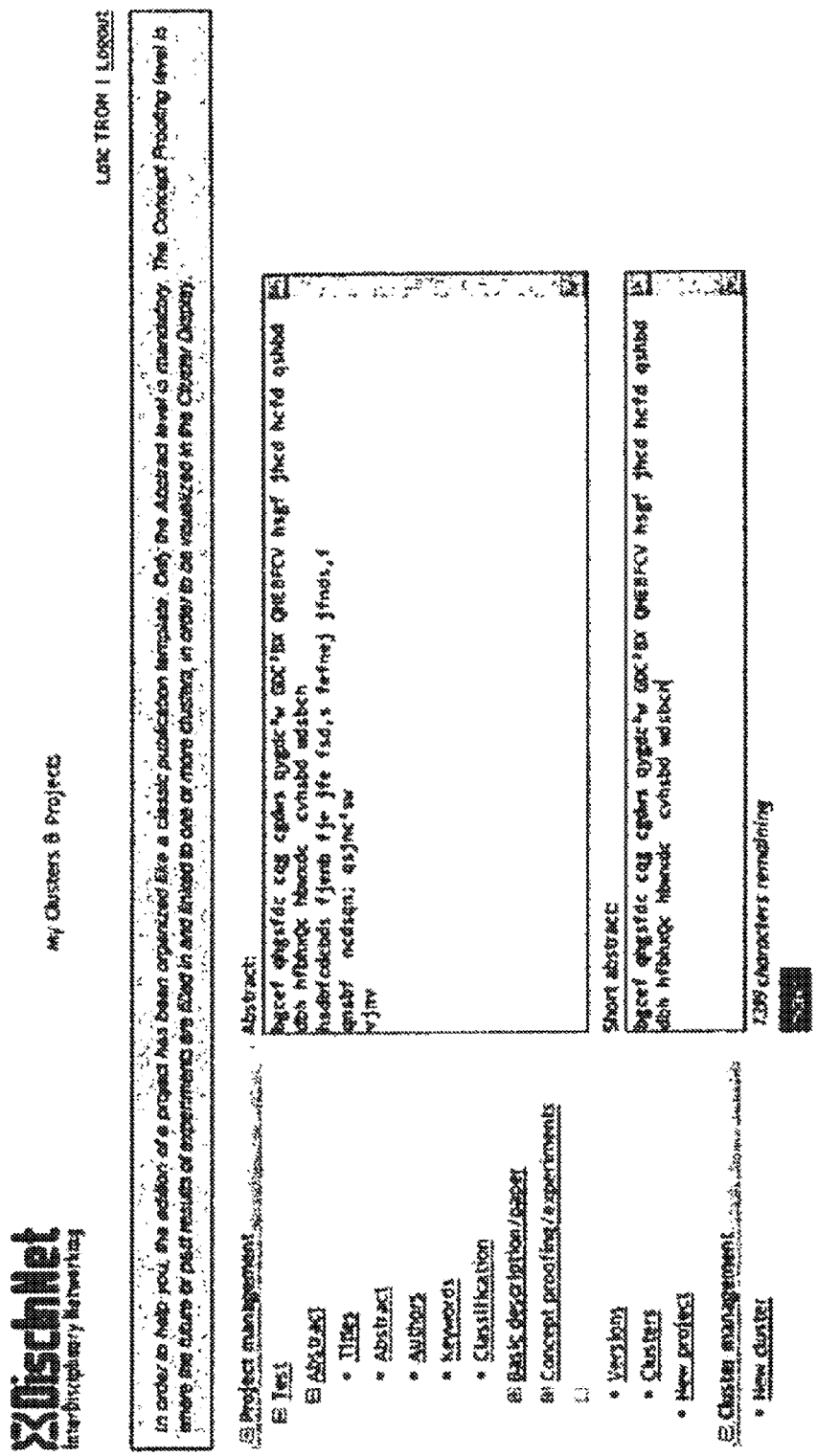
FIG. 6 is a screenshot of an abstract entry form page to fill in a registration home page in accordance with one embodiment of the present invention.

From this registration page, at step 100, a user submits one or several experimental research projects. This task has been organized like a publication template, with only the Abstract as mandatory as shown in FIGS. 4 and 6.

Figure 8:
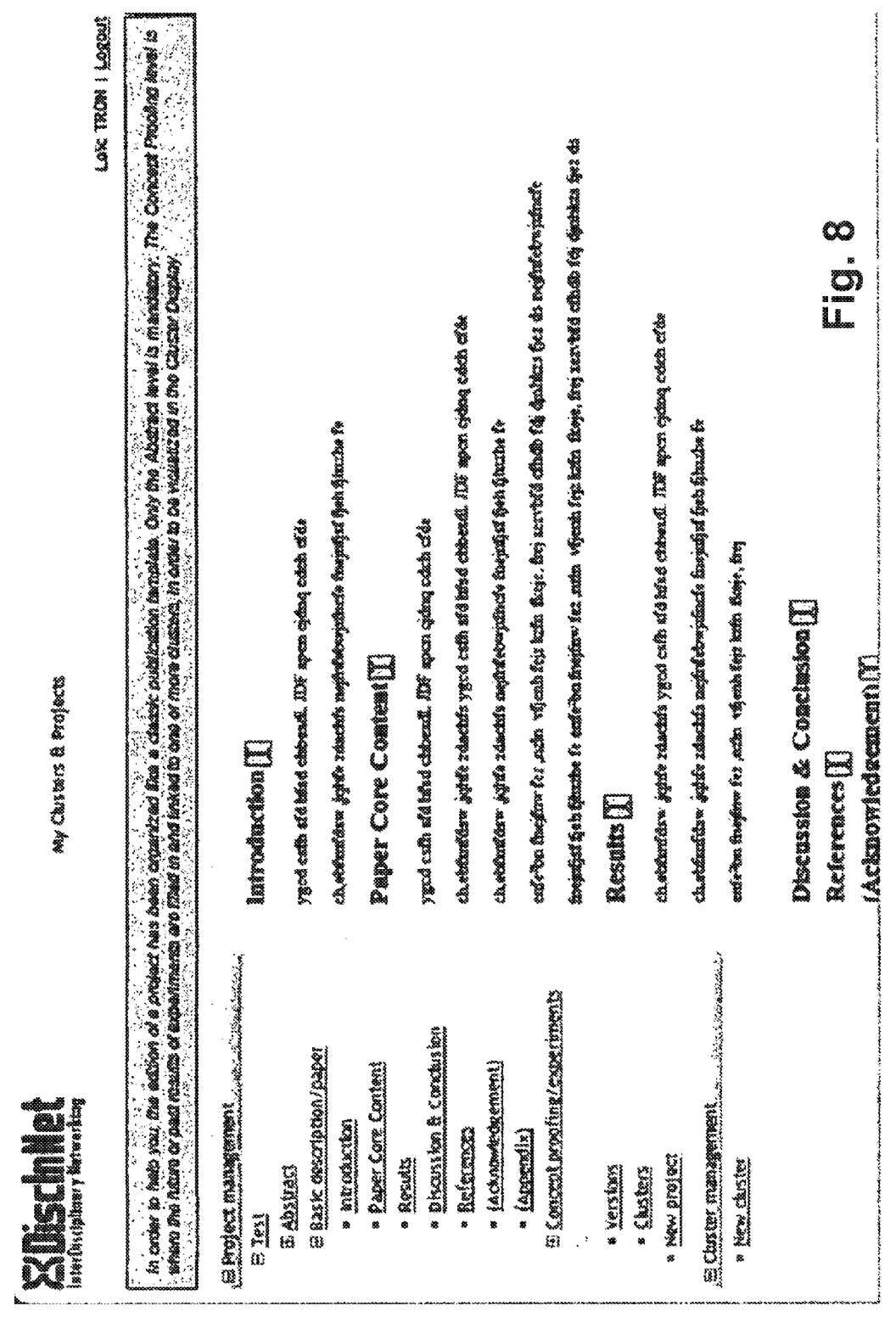

Each user may capture other data to define his project such as the author, or main author for a research team, the title (see FIG. 4), date, link to full text provided by the author (see FIG. 3—step 100) or the full text of the project detailing introduction and/or paper core content as shown in FIG. 8 and keywords in the customary following order although some steps may be almost empty.

Figure 5:
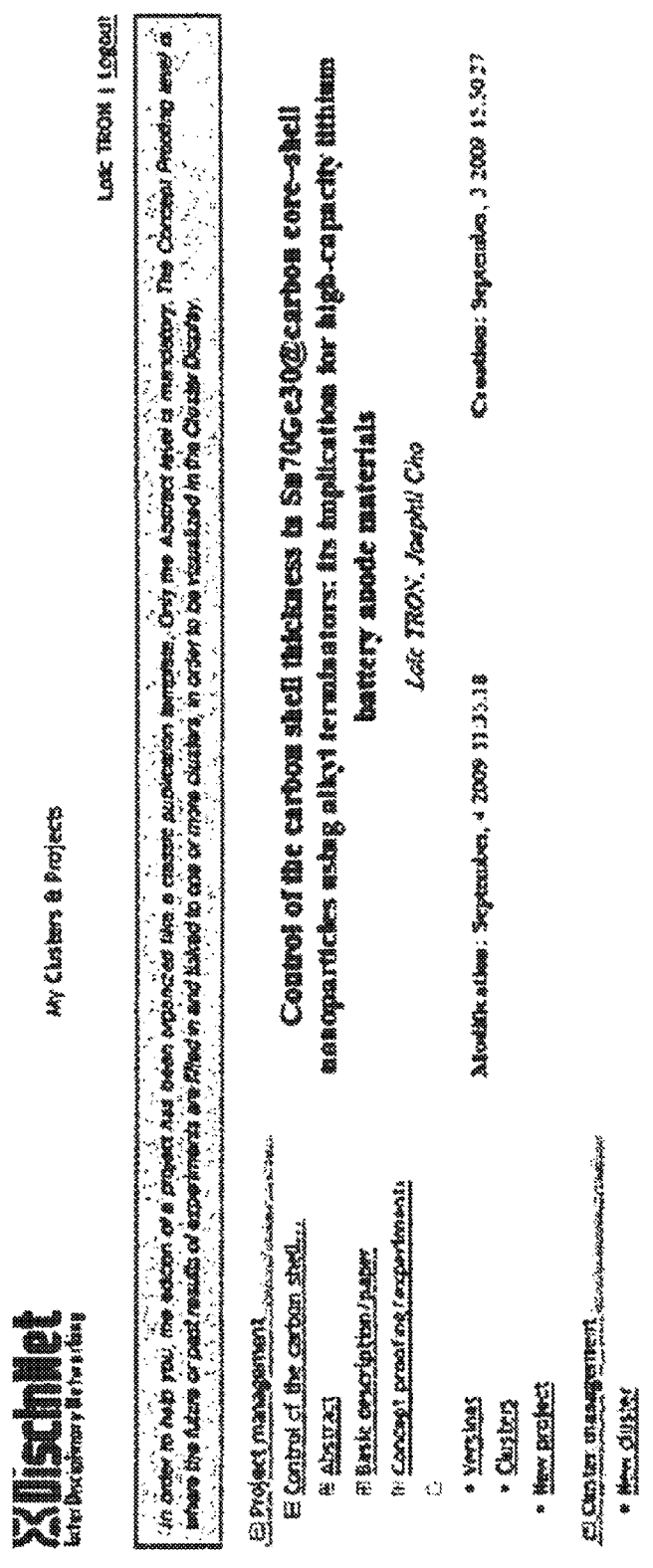
Figure 7:
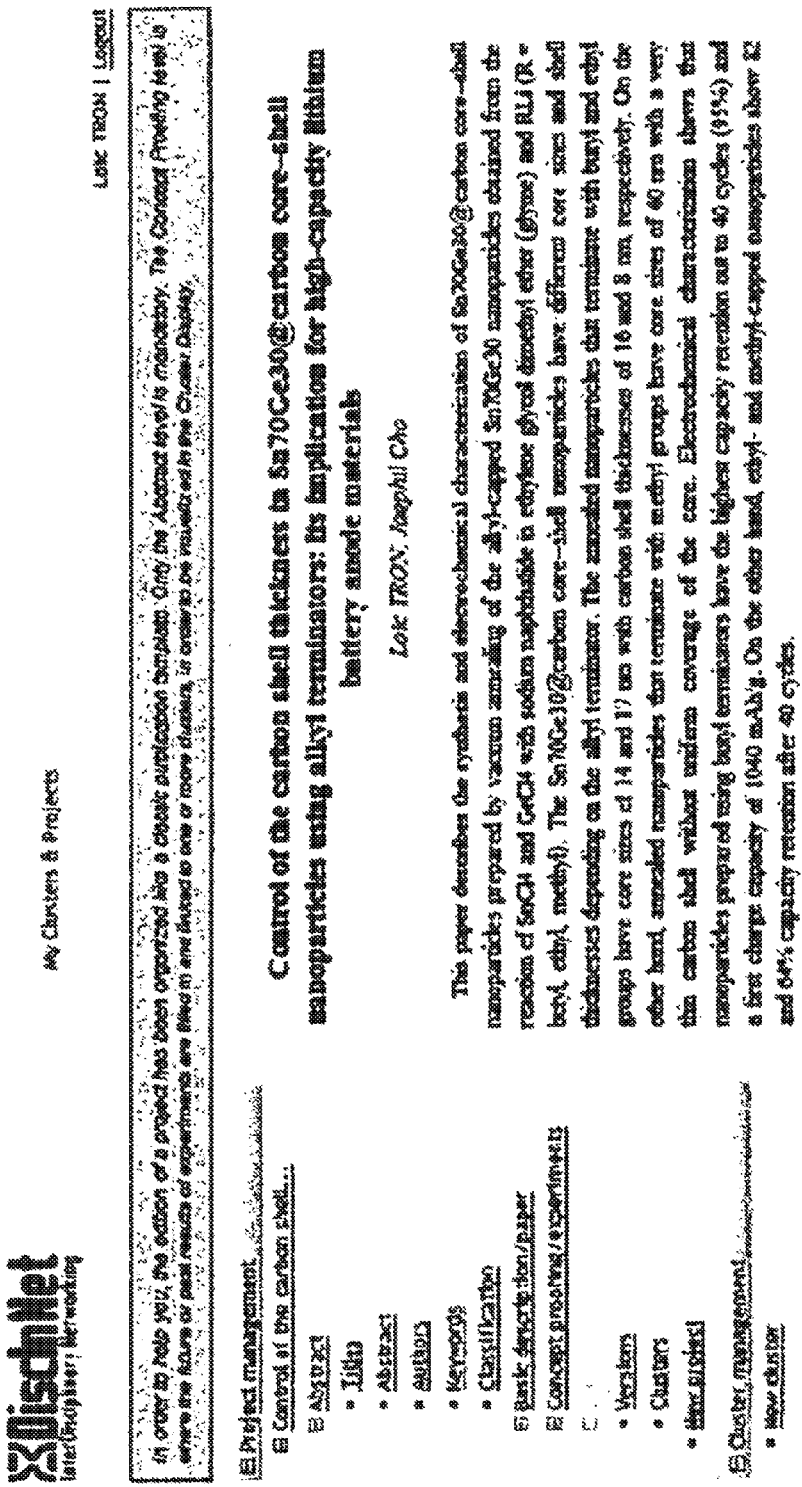
FIG. 7 shows a sample of an abstract of the experimental research project registered in FIG. 5.

FIGS. 5 and 7 show a detailed view of an experimental research project submitted. Shown is a project about the "Control of the carbon shell thickness in Sn70Ge30@carbon-core shell nanoparticles using alkyl terminators and its implication for high capacity lithium battery anode materials" wherein the abstract, the author and keywords are specified in FIG. 7.

It should be noted that registering an experimental research project is necessary to access the system 10 services. If a user does not have an experimental research project, he may submit a project which is a reference to other authors' experimental results if these results are already published in one or several publications.

The system 10 allows a user to fill in an experimental research project with its associated state of art publications. Different types of links may be used to link all these items.

In step 101 (FIG. 3), the user describe one or several experiments associated with the experimental research project by filling different criteria such as the title, the description of the experiment, the design and so on.

Several types of links may be used between experimental research projects in a series or experiments in a series to facilitate their reading as a history, by example by linking them to a common design, common title and numbering.

Figure 9:
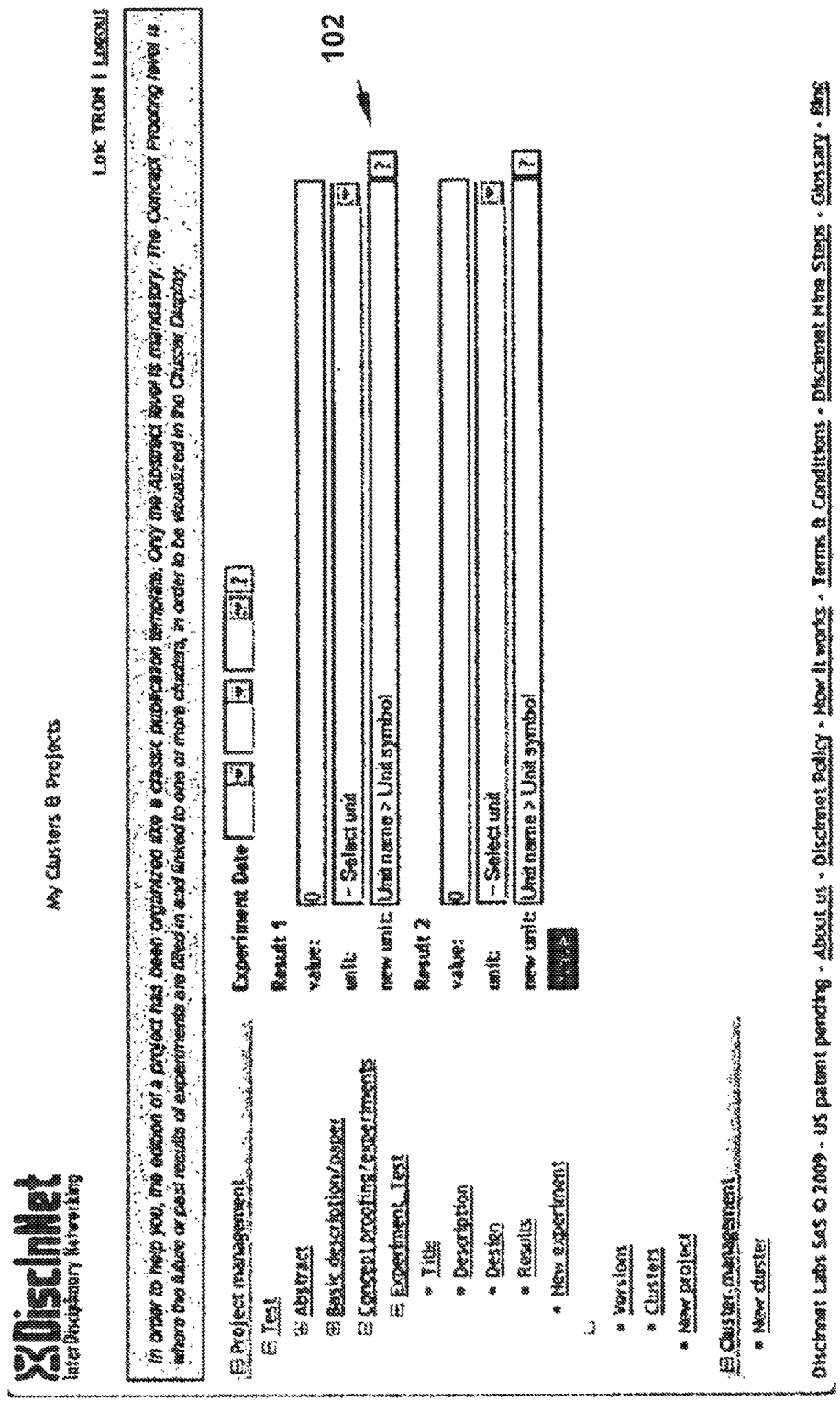
FIG. 9 shows how one might enter results for a given experiment of an experimental research project, by registering values and selecting units.
Figure 10:
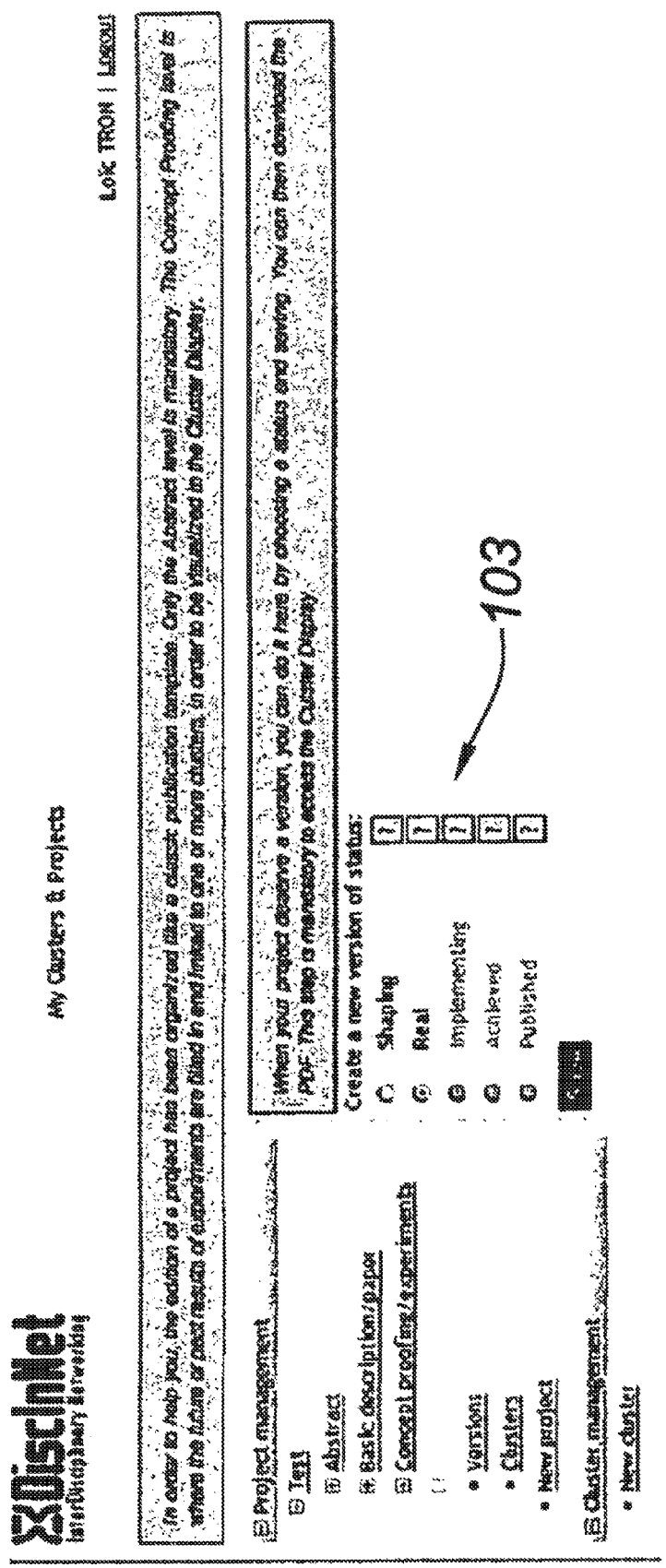
FIG. 10 is a screenshot illustrating a selection of a status of the degree of accomplishment of an experimental research project in accordance with one embodiment of the present invention.

Then, in step 102, as shown in FIG. 9, the user have to select the optimal, most meaningful representation of the most specific outcomes of their experiment, i.e. experimental results that provide relevant scientific information from one or more experiments of their project.

The user captures the experimental results according to some appropriate measurement units or dimensions.

This will be made using a units base of the content server 15 or, only when necessary, by adding a new unit in it.

In several embodiments, results may be defined according to one or more physical units, dimensions, ranges and scales, such as m, s, Watts (W) or mW, m/s, m/s2, N, ohms, and so on.

FIG. 11 illustrates an example of an experiment entitled Sn70Ge30@carbon-core shell nanoparticles related to the project shown in FIG. 7. Shown are experimental results of the electrochemical characterization of the nanoparticles.

Users should be cautious not to create new measurement units before checking that appropriate and already customary units exist with another name and/or symbol in the base.

According to the invention, in step 103, the results set related to the experiments captured according to some measurements units or dimensions should be defined with a status corresponding to a degree of accomplishment of the experiment in order to show to a community where your experimental research project is standing.

Advantageously, these results may be whether published or, as much as possible, targeted on the basis of an experiment expectation or design, estimated, simulated or calculated, as explained here below.

Figure 2:
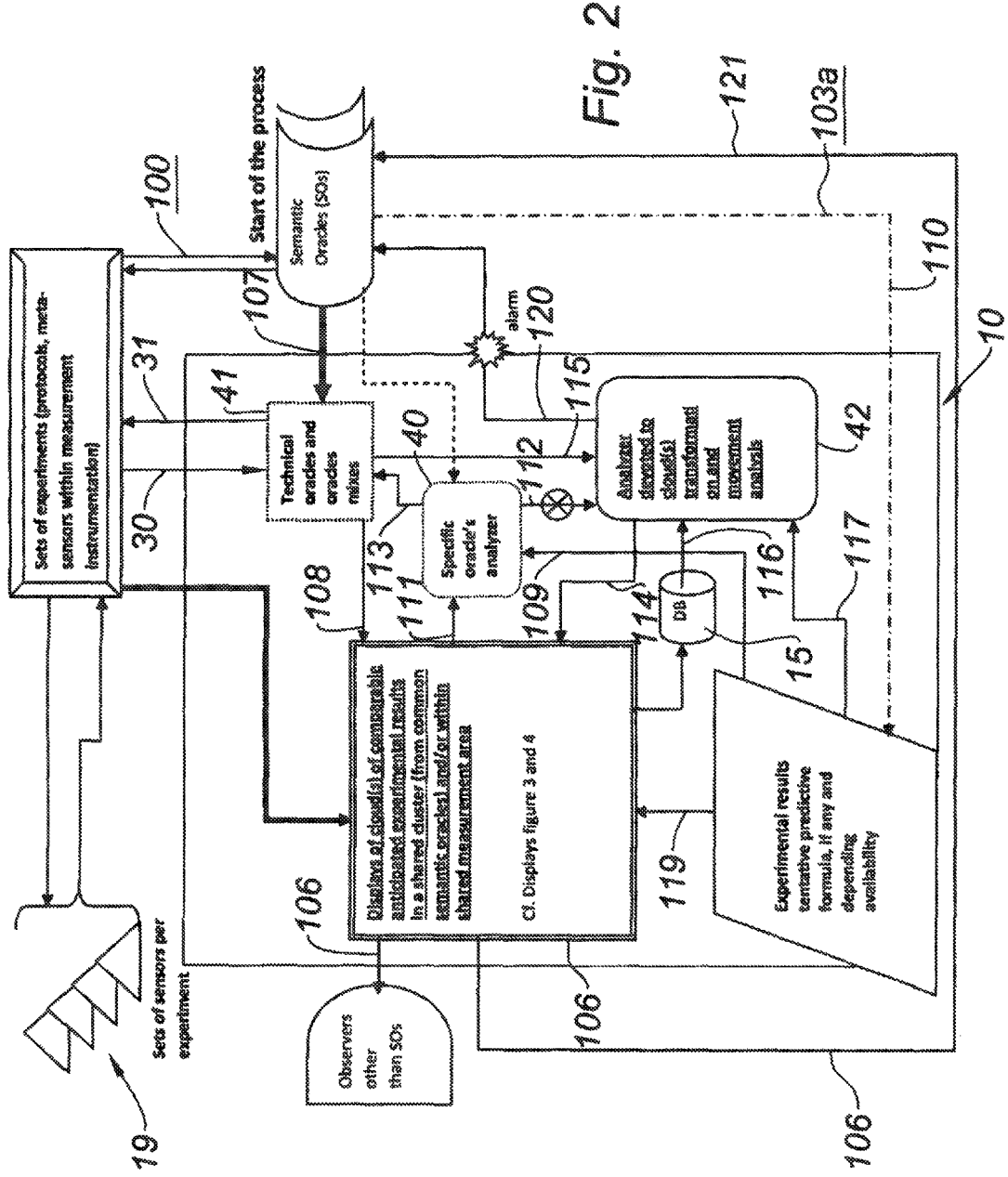
FIG. 2 a flow diagram of a part of a scientific information management network-based method according to the present invention.

The status may be chosen among a discrete series of available status as illustrated in FIG. 11 and FIG. 2.

The definitions of said statuses of the experimental results related to an experiment are the following.

'Shaping' characterizes the first stage of an experimental research project (step 103a in FIG. 2). This defines targeting experimental results of an experiment related to an experimental protocol formulated, namely from some result predictive form, but not designed yet with technical devices and quoted in an operational manner.

'Real' characterizes the second stage of an experimental research project. This defines targeting experimental results of an experiment based upon an achieved design of the experiment protocol, at least as a scheme, a layout or already a prototype aiming at exhibiting the results in the announced measurement units range or bandwidth.

For example, when the 'Shaping' status refers to a theoretical modeling then the subsequent 'Real' status refers to the experimental design capable of realizing an experiment to test it.

'Implementing' characterizes the third stage of an experimental research project (step 103b in FIG. 2).

This last one depicts experimental results of an experiment actually undertaken, i.e. that an experimental set up aiming at implementing the experiment protocol is available, hence with a delivery horizon.

The transition between 'Real' and 'Implementing' status for the experiments is the existence of a budget.

One should note that many experiments adapting a design do not require significant budget. Consequently, they shift from 'Real' to 'Implementing' without notice.

Figure 3:
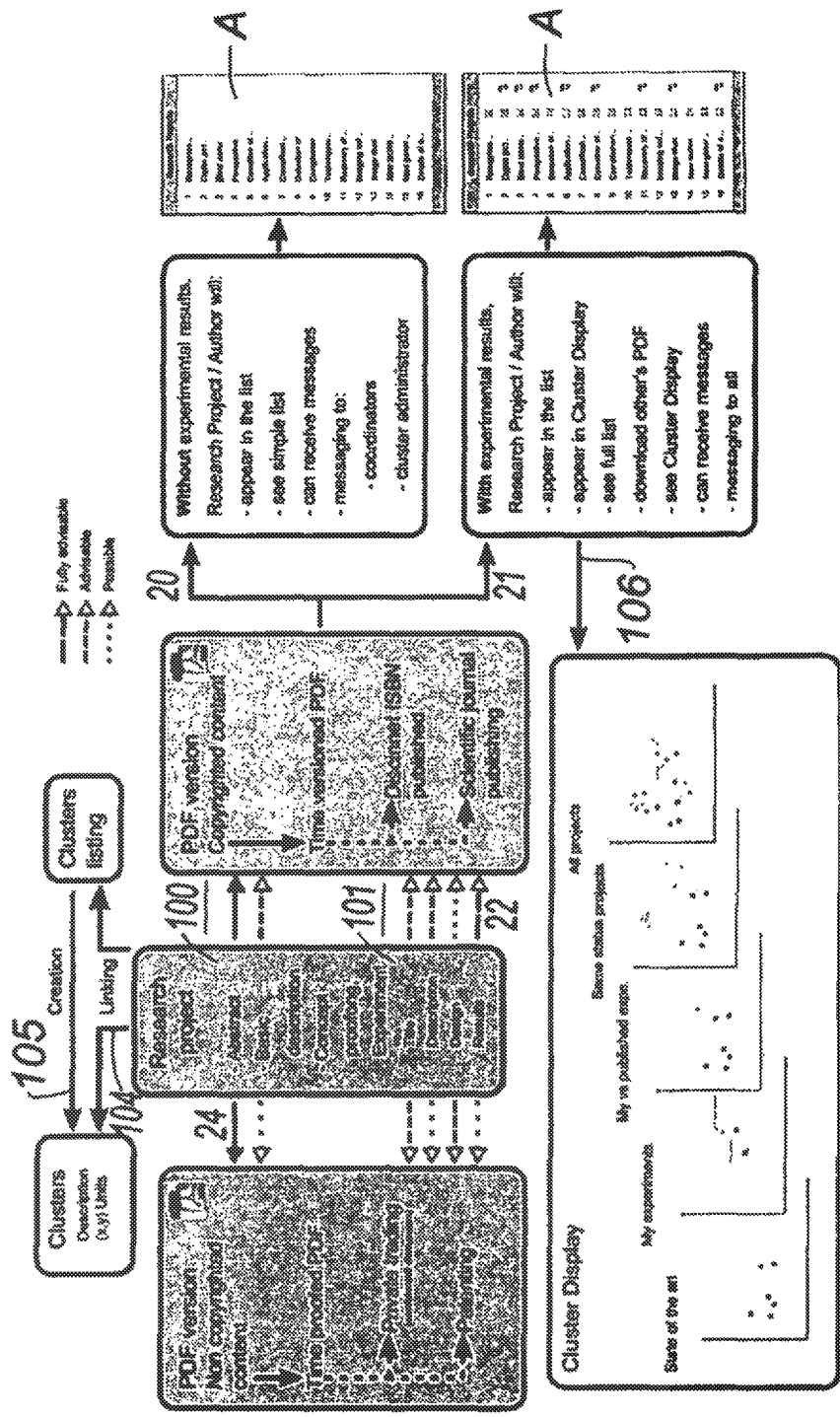
FIG. 3 is a flow diagram illustrating a part of a registration step of an experimental research project in accordance with one embodiment of the present invention.

Moreover, if a comprehensive enough design is captured and elected to be copyrighted, or rather kept confidential for patenting or possible trading purpose, such as illustrated in FIG. 3, but indicates no delivery date, the status of the experimental project should be marked as 'Real'.

'Achieved' characterizes a fourth stage of an experimental research project. An achieved experiment is characterized by a past date, at which the experimental results have been observed and measured at a defined time from the experimental set up.

The split between both achieved and implemented statuses comes from the experiment date—past for an 'achieved' result and future, for an 'implementing' one. They have in common at least defined design and budget.

'Published' or 'state of art' characterizes a final stage of an experimental research project.

This last status depicts experimental results that have been published. It leaves the status of achieved to an historical private event for the author to become a public one, as published.

More precisely, this status assumes that the experiments usually have been sufficiently replicated by its performing author(s), cross tested to nearby and further experimentalists results and validated by their author(s)' environment, to begin with colleagues, referees, or reviewers.

These experiments might correspond to series of tests conducted by the author's environment with nearby or further types of experimental devices, eventually with different descriptive wording.

One embodiment of the invention might complete this series of discrete statuses with a complementary status corresponding to the type of complement needed to progress.

This division into several statutes can be approached from a very general way, since every level can itself be cut to an underlying level of analysis between these same types of statuses or others showing the same complementarities.

In one embodiment, we can cut the status C with statuses represented by complementary quarter pie of different orientation.

Following the registration of the status of the experiment results, the user has to link, in step 104, its experimental research project with its experiments to a particular research community or cluster chosen among a plurality of existing or not clusters, as illustrated in FIGS. 3, 12 to 14.

A cluster represents an active group of users thinking that their experiments share or target a common objective goal.

The cluster is defined by a set of experiments or experimental research projects that combine a group of common keys and a volume of comparable experiments.

A cluster combine a group of common keys usually including keywords, orientations, trigger effects and measurements scale(s) and units of the set of experiments or experimental research projects.

The cluster is independent from the statuses of the experimental results of the experiments.

It should be noted that the cluster might be a set of individual goals of each of the cluster's members which have the common objective goal as an outgoing resultant.

Consequently, the volume of comparable experiments may also be divided into several subclusters, each sub cluster combining a group of particular features in common yet sharing the common objective goal of the cluster.

Definitions of the measurement units are elaborated according to the cluster goal and will circumvent the set of comparable experiments around which the users may become a valid community.

The cluster and its features may be created by a user or the system 10, who become the cluster manager.

In a substep, a member of the cluster may discuss with the others members about the choice of units, measure normalization or limits of the cluster. Modifications can be made by the cluster manager, if is necessary.

However, the author of an experimental research project is expected to choose measurement scales or units according to its vision, rather than solely according to a given cluster's commonly agreed optimal measurement units.

Figure 12:
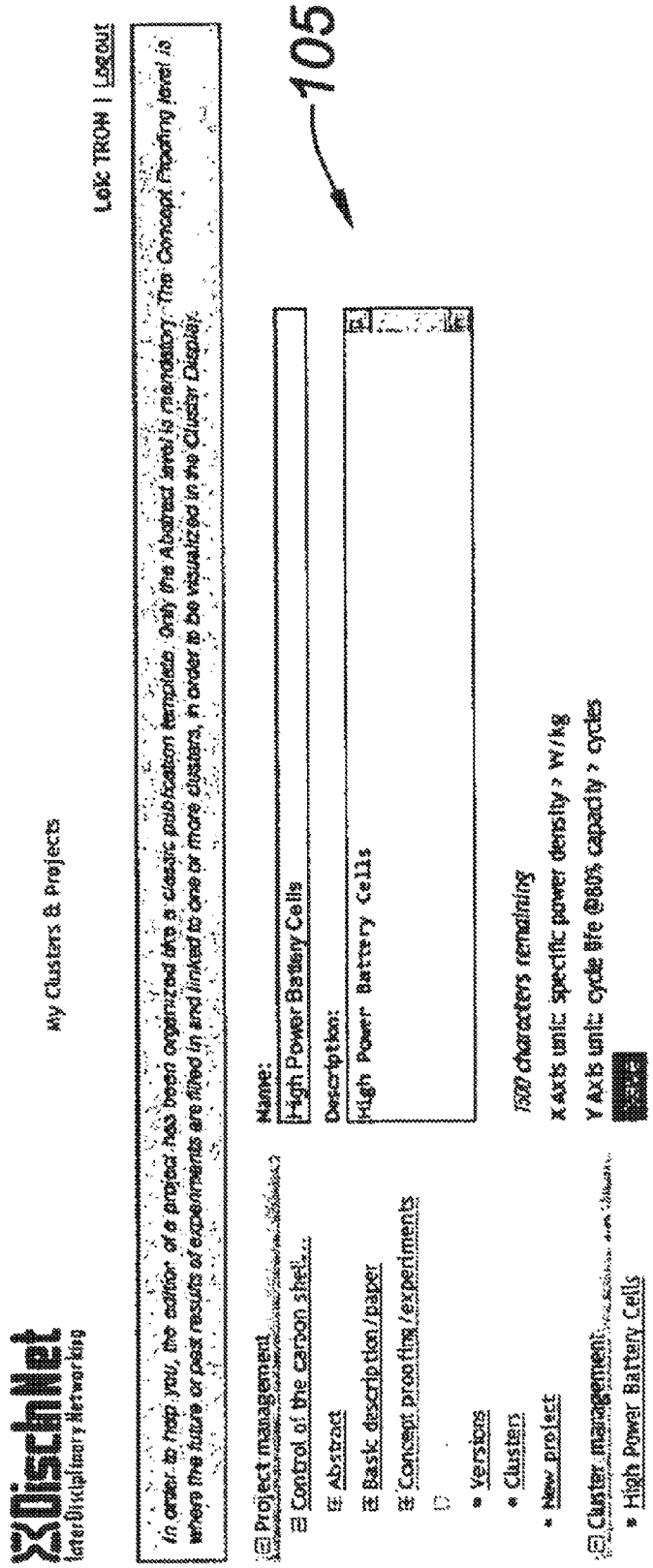
FIG. 12 is a screenshot of a form page to create a cluster.

Consequently, the user can create a cluster with the appropriate measure units and measuring devices by clicking on the link defining cluster management, as shown in FIGS. 12 and 3 (step 105).

This offers the opportunity to contribute to cluster creation, critique or enrichment.

For an effective return on the experiments that were registered compared to ones of the other members of a cluster as will be described further in connection with FIGS. 15 to 19, the user should choose an appropriate cluster to link its project.

Advantageously, a project may pertain to several clusters. This fosters the footpaths between diverse clusters that will bear interdisciplinary linkage as described below.

Figure 13:
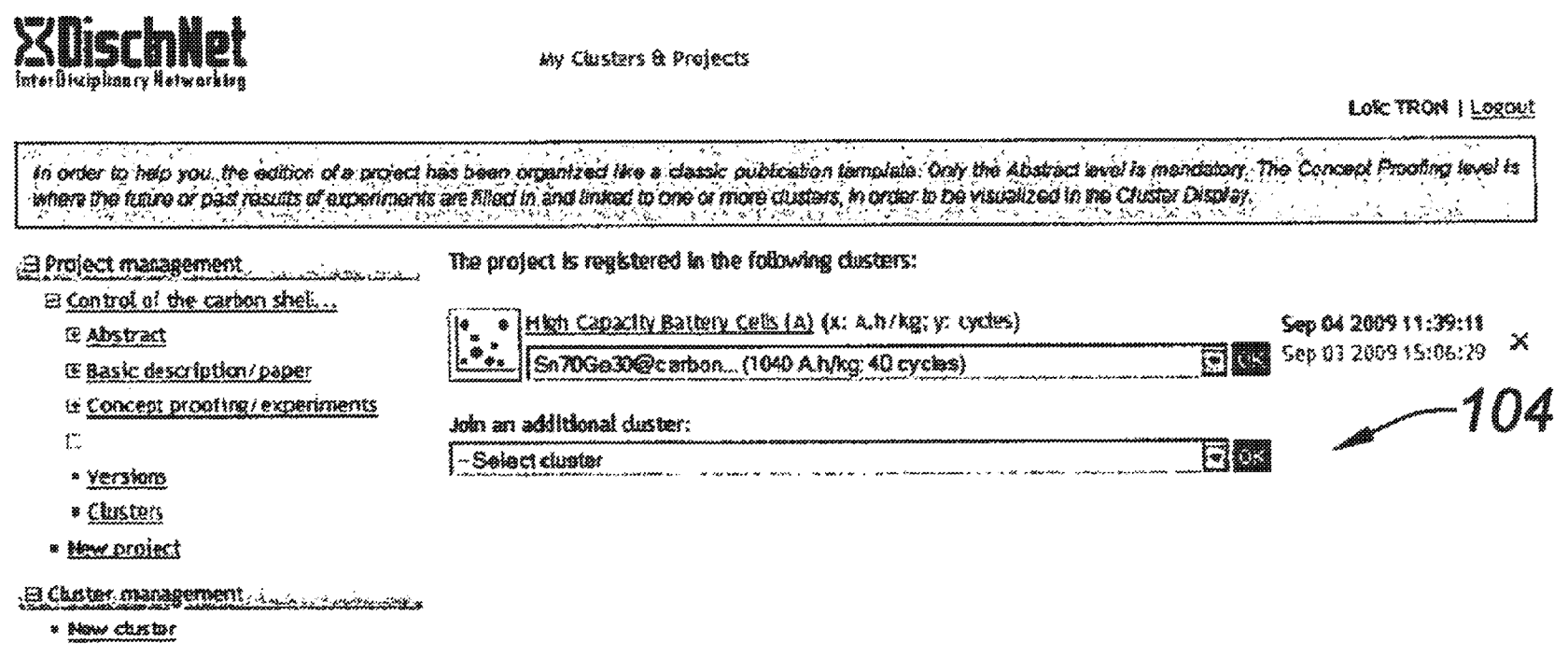
Figure 14:
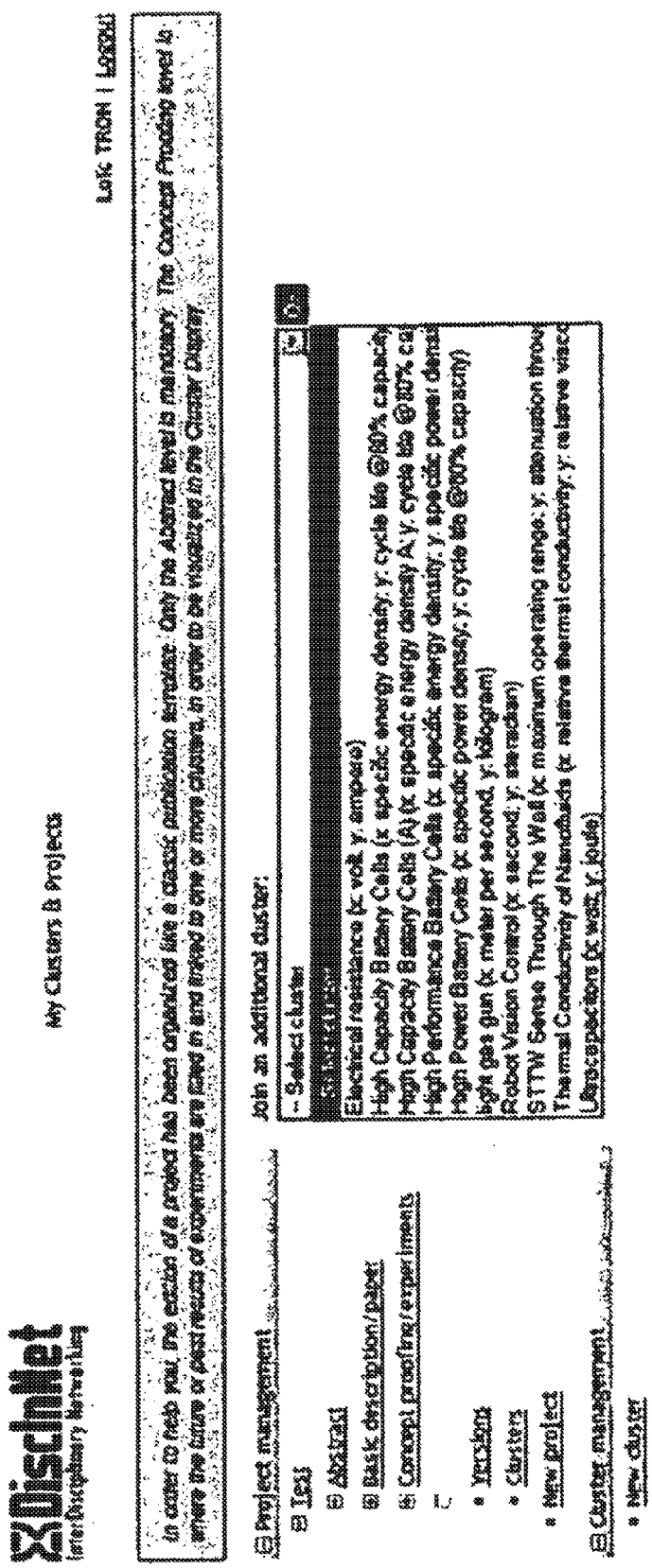
FIG. 14 is a sample of a cluster selecting bar.

As an example of complementary clusters illustrated in FIGS. 12 to 14, the experiment entitled Sn70Ge30@carbon-core shell nanoparticles, in FIG. 11 may be link to a generic "high power battery cells" cluster (as shown in FIG. 13), to other clusters as well, illustrated in FIG. 14 such as, e.g. "high power battery cells" cluster.

One immediately sees that clusters should therefore continuously evolve, with most adapted ones for future directions of research becoming more selected by new users.

However, in order to maintain consistency over time, the system allows users, in the cluster management, to add other measurement units to existing clusters and therefore to adapt some clusters themselves rather than necessarily create new ones.

After the registration form is completed and submitted to the registration server 16, experimental research projects data are imported and stored (non illustrated) in the content server 15 and connection between each submitted data relative each other and relative other appropriate data in the content server 15 is established as appropriate, i.e. depending on the linkages defined during the registration or process by the data processor 17 during a correlation process of data.

In the next step 106, as shown in FIG. 2, the data processor 17 outputs from the content server 15 results from several users within a shared cluster and generates a common representation of these results to be projected to different users, depending on an chosen display mode.

This representation includes data set including set of one or more results derived from experiments within a shared cluster, each result being associated with a status.

Figure 20:
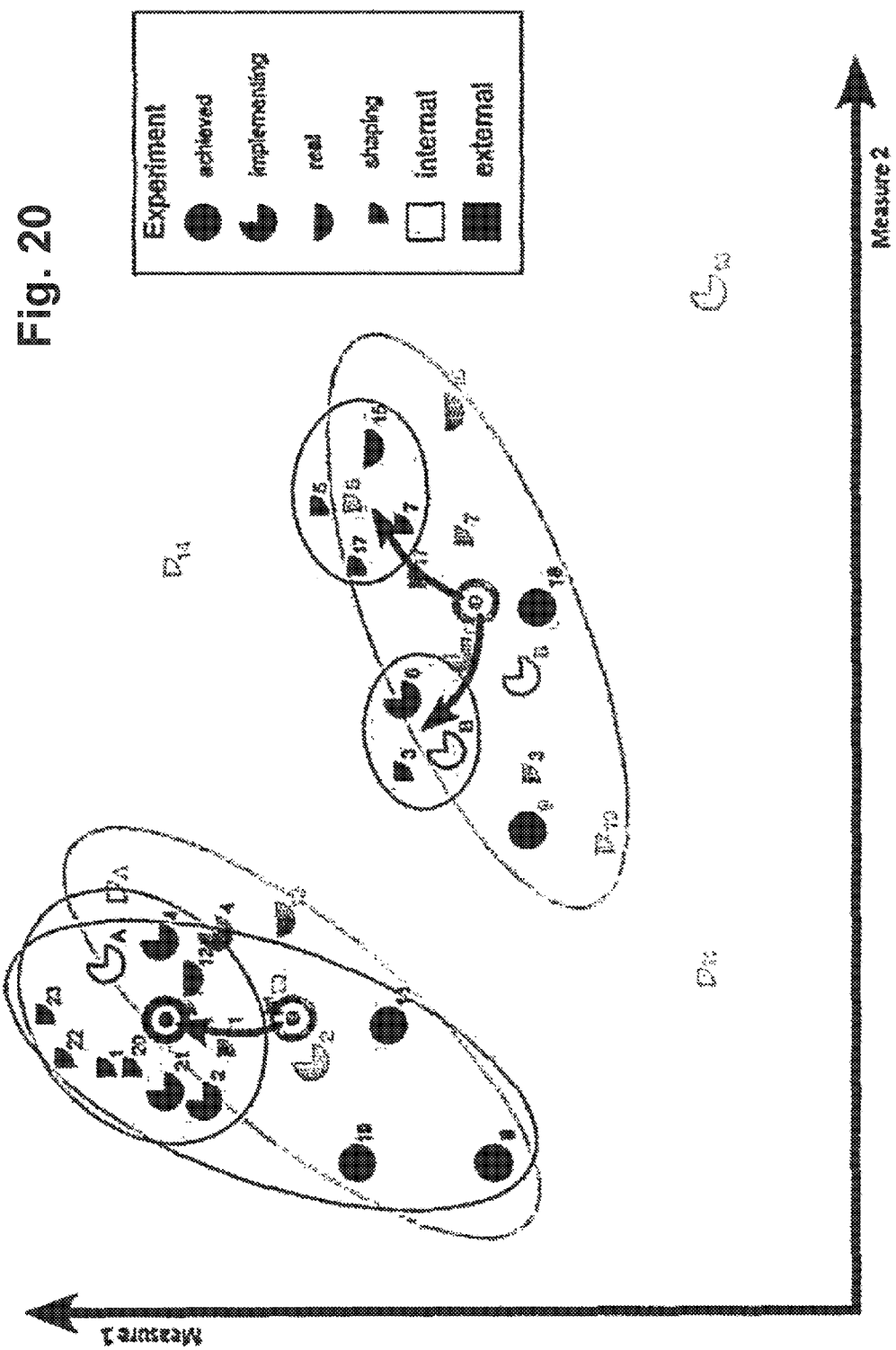
FIG. 20 illustrates a representation of several intertwining clusters.

The data processor 17 may project the results according to diverse levels, such as the level of their status, a forecasted time period for such status accomplishment and/or by other types of display, such as a confidence level as exhibited on FIG. 20.

In a preferred embodiment, the data processor 17 projects the relative location of the experimental results with their status.

It is then possible to visualize advanced projects at an early stage, while others may have less radical results but are already or almost published.

The data processor 17 processes the experimental results as one or several dimensions compact shape depicting the result, hence covering some homogeneous or inhomogeneous area.

Figure 15:
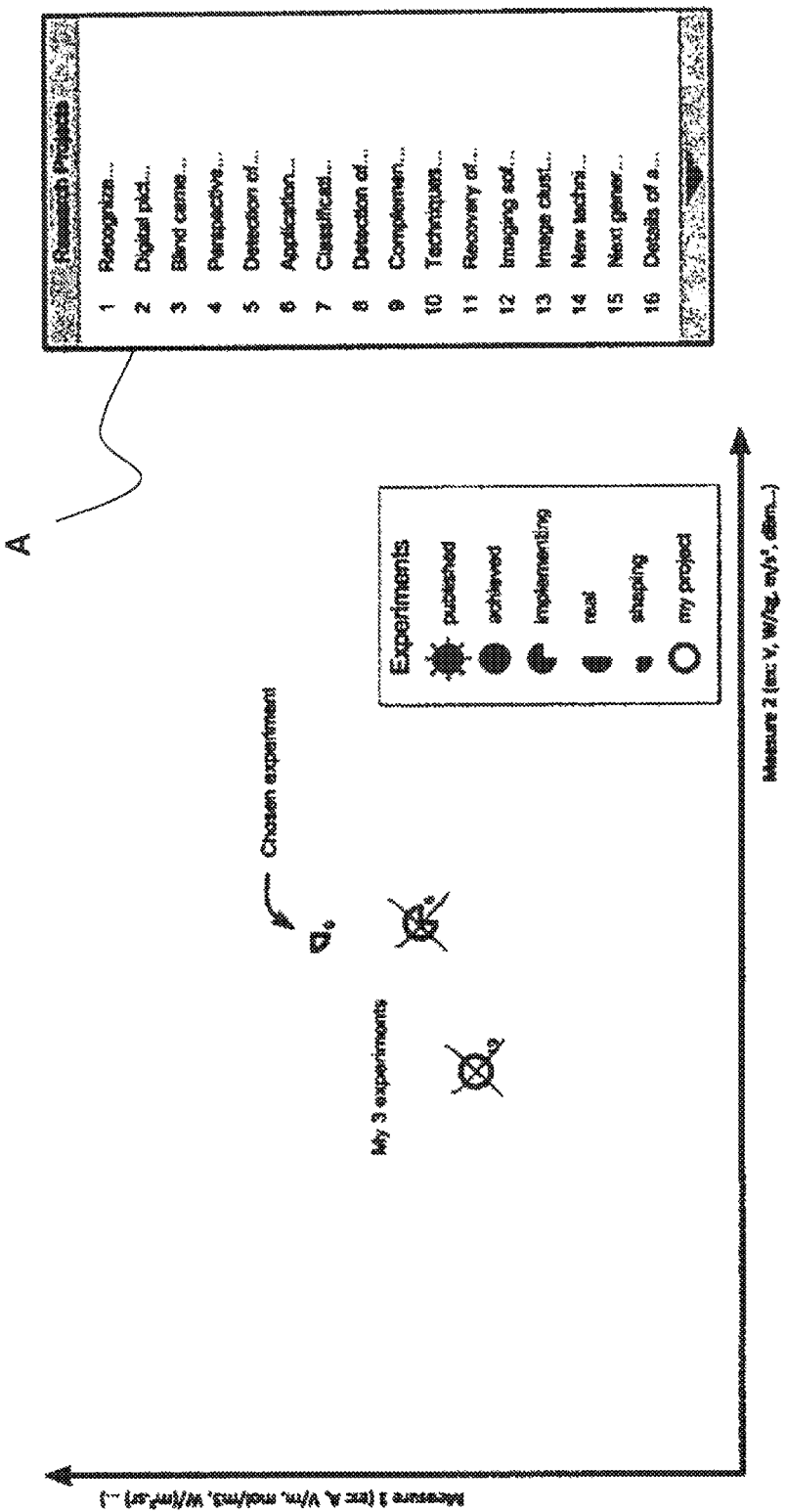
Figure 16:
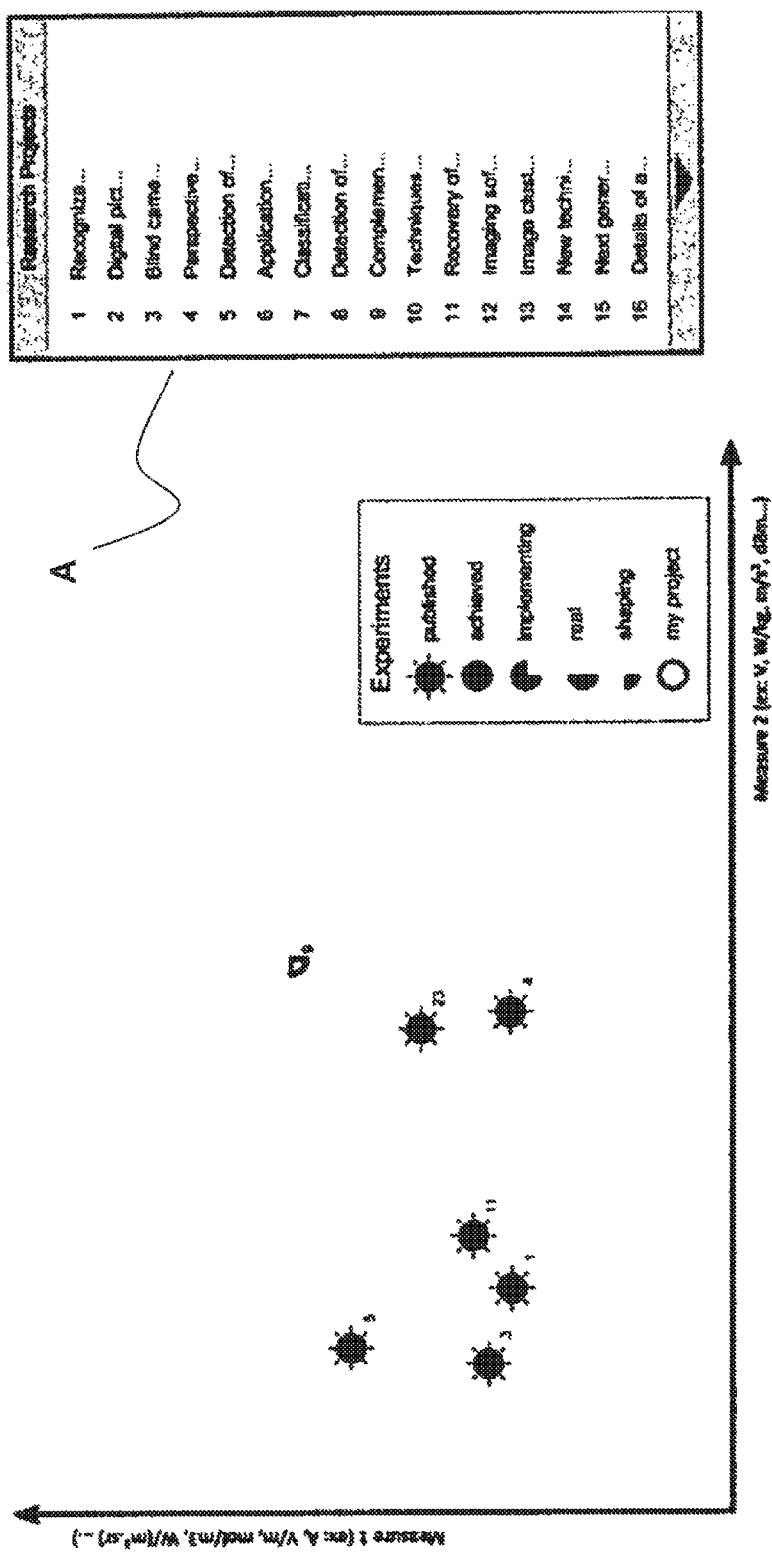
Figure 17:
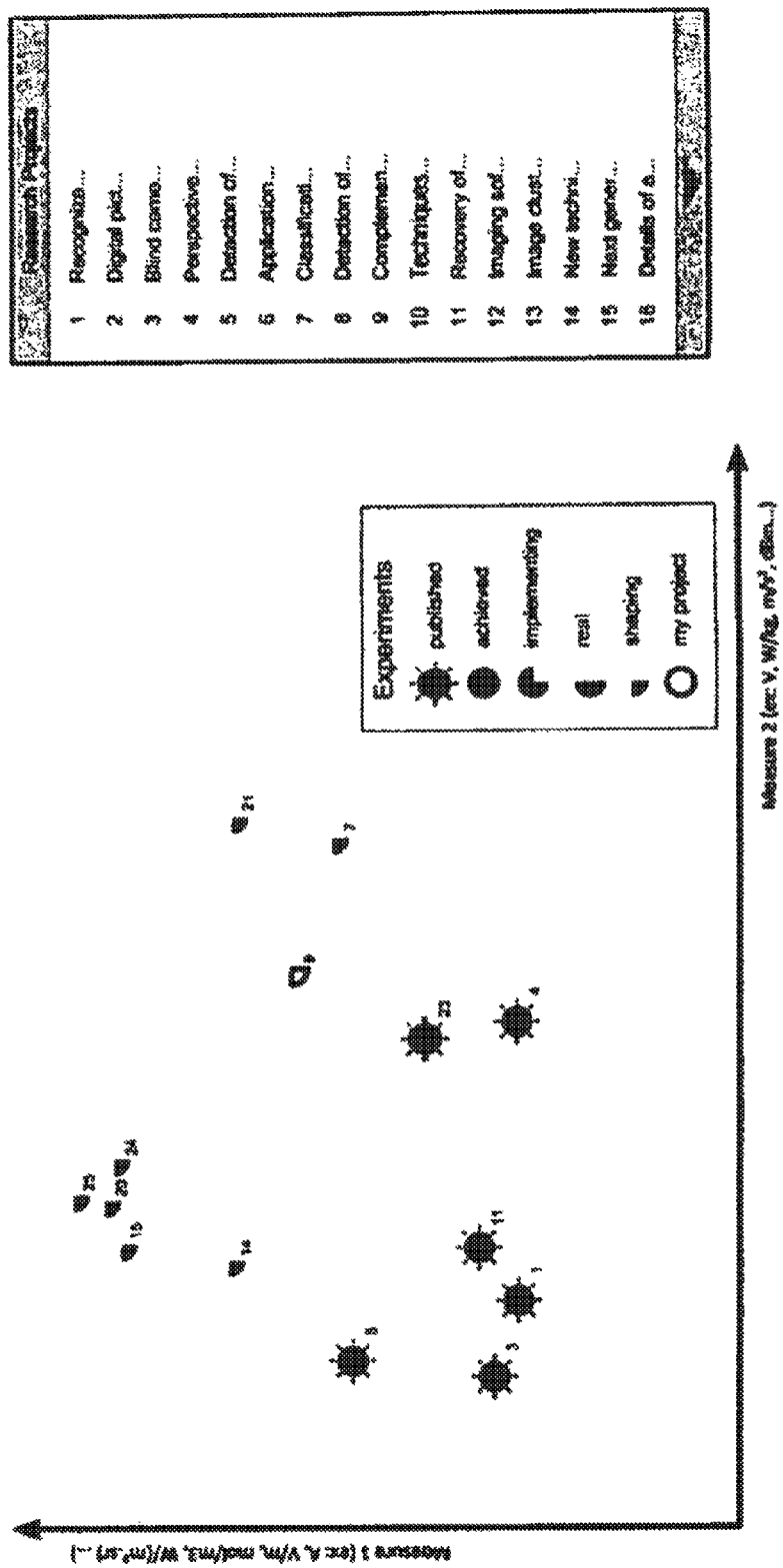

FIGS. 15 to 17 illustrate screen shots of samples of display of an experimental research project within its cluster.

FIG. 15 shows a projection, along two measurement axis, of the location of user's different experimental results with the status submitted by the user, some of them being not considered as relevant to be shared with other members of the cluster.

Symbols of the status of the experimental results vary between a part of or a total pie.

FIG. 16 illustrates the location of the chosen experiment in FIG. 15 compared to the one of the results from state of art publications whereas FIG. 17 illustrated the location of the chosen experiment in FIG. 15 compared to the location of shaping and published experimental results from other members of the cluster.

Each of the projected experiment is cited in a specific window A as a list of experiments within the cluster.

More generally, as illustrated in FIG. 3 (step 20), a member of a cluster who has not submitted experimental results may appear in the list of experiments of the cluster A and see a simple list of experiments. He can, also, receive and send messages from/to the cluster manager.

A member of a cluster who has submitted experimental results may do the following: appear in the list, appear in clusters displays, see the full list of experiments, downloads other's experimental research projects, and send/receive messages to/from all the members (step 21).

One should note that, in the representation, the experiments linked into a subcluster may be projected in a special way, such as a form joining all relevant items of the subcluster.

The data processor 17 may also retrieve from the content server 15 at least one of the following outputs automatically or with user queries:
the existence of experimental protocols, experimental setups or experimental data having a status of the same type as a user's project;
experimental results having a status of the same type as a user's project;
progress to be made in the design of an experimental protocol, when one of the status shaping or real has been previously input by a user by comparing with other projects with same or different status;
Linking an experimental research project to one or several clusters and sharing within the cluster its experimental results with different status of degree of accomplishment of the project shows the power and speed of a system and the method according to the present invention.

One is freed from a laborious work to collect, sort, analyze and interpret documents or publications reporting experiments or experimental results that may be relevant to its own experimental research project.

The relevance of the experiments depends upon the sharing of the same cluster.

It offers several others advantages to the user.

One should submit his experimental research project by choosing carefully which experiments to save between those perhaps already achieved and those, more risky but possibly more promising, or merely designed but not yet launched.

Adding current or future experiments and their expected-to-achieved (shaping/real or implementing) experimental results is essential.

Indeed, the projection of the results offers a common perception of what experiments should look like and target at a given level, hence with similar status.

Moreover, users of a shared cluster may share and compare their results for publishing and these may range from scientific discovery contributing to knowledge enrichment to applied research opening paths to technological leaps.

Users of a shared cluster with experimental results with similar 'achieved' status may also call for replications by their nearby environment, for common or concurring publishing, for further cross-checking and better validation or for opening potentially powerful interdisciplinary cooperation.

Users of a shared cluster with experimental results with similar 'implementing' status, meanwhile, may announce to potential reviewers, colleagues and any other that the type of result presented is going to be measured or at least tested in a defined time frame.

Users of a shared cluster with experimental results with similar 'real' status may find funding and/or partnering opportunities in order to launch the implementation.

Users of a shared cluster with experimental results with similar 'shaping' status may want to highlight a starting or even merely potential research project, for example with theoretical or sketch of a targeted new level of scientific result. Diverse theoretical anticipations may also be compared between authors of several models.

Moreover, new fields of research, hence with a high percentage of fields still in their infancy in a state of progress where the goals and most appropriate methods of study and measurement units lack, may be highlighted and their development accelerated.

The server 13 provides social network tools to enhance the development of the experimental research project submitted to the system.

Within a cluster, the user may contact members of clusters who work on projects that could be connected to his. The system 10 allows users to send emails and/or to submit a post to the system to the attention of one or several others members with matching interests.

Submitted comments may or may not be subject to moderation.

This allows members of the same cluster to exchange on their experiments. Experiments can then be shared due to expensive equipment and/or new ideas can emerge from discussions between researchers having different approaches.

The issues encountered in the formulation of an experimental protocol, the design of an experimental setup may be discussed between members of cluster.

Potential partnership and co financing can thus be discovered between a researcher having complementary skills or means.

The server 13 allows, also, a user to restrict the access in part or in whole of his project data to one or more registered members within a shared cluster.

The server 13 provides also notifications that may be sent to members with matching interests, though the data processor 17.

The members may suggest the parameters of the seek-partnering or the data processor 17 may analyze links to be suggested and communicated to members with matching interests, for instance by correlation scoring of the submitted data or in relation to the analysis results of evolutions of the cluster and its phase transitions, explained below.

Others preferences are offered to users.

Notifications may be sent to users about submissions that exist in their affiliate clusters.

Users may also invite colleagues to register in the system 10 in order to access all the utilities and features of the same.

The server 13 allows the user to enter one or a plurality of e-mail addresses for colleagues he would like to invite to the system 10. The message that will be sent to the colleagues may include the description of the present system, the benefits of joining the system and the steps required to.

The invited colleague may initiate the process to join the system by clicking directly on a link included in the e-mail message.

In order to add weight to his visibility, the system 10 allows users to invite some of his colleagues to become a referee. This referee will then have the possibility to add comments to the user's project.

The server 13 manages also members of a cluster's requests. Members of a cluster can view the requests of others members.

A member can upload, share or not (if his project is a non copyrighted content as shown in FIG. 3 step 24), receive and organize content of experimental research projects. 10

Also, the system 10 offers the opportunity to forward the experimental research projects submitted to publishers, and help them to consider publishing as shown in step 22 in FIG. 3.

In a next step related to FIG. 2, an analysis, a representation of the cluster's behavior and an evolution over time or time horizons when captured may be processed, generated and displayed to one or several members of a shared cluster or sub cluster.

Indeed, a cluster may be seen as an emerging form with possible fusion, vanishing, fission, precipitation or coalescence. It is a virtual entity acquiring specific reality through group consistency and achievement precipitated as new technology.

Experiments or cluster may be evaluated over time whether from user's projects own evolutions, externally influenced by interactions with others members, or according to other changes, either from the environment or other project automated factors as will be described below.

In a first substep, a member of the cluster may be invited to update his experimental research project by recasting his experiments over time, i.e. reallocating experimental results of the experiment towards the preset result.

This may be controlled by feeding automatically new experimental results to the registration server 16 (for real to implemented results) without requiring any human intervention or by the member reinterpretation.

The scientific information management network-based system 10 is designed to be permanently aware of these incoming, progressing and shifting experimental research projects.

As shown in FIG. 2, it comprises several types of analyzer, namely a specific oracle analyzer 40 and an analyzer 42, and levels of oracles, namely technical oracles 41 used for the specific purpose of detecting, hence integrating cluster dynamics (aggregate) which encompasses precipitation, condensation and other trends anticipations or analysis that will be illustrated later with FIGS. 18 to 21.

It starts from a set of appropriate oracles called 'technical oracles' 41.

Technical oracles 41 are components having a capacity similar but inferior to semantic oracles' in terms of halting/deciding capacity (halting with an answer to a question, or a choice). In the case of most scientific experiments this capacity is sufficient for all or part of the piloting (arrow 31) of measurement instruments and sensors. Also for the corresponding level of interpretation (arrow 30 possibly but usually through the path 4→6→10 which deals with experimental feedbacks) because, in the specific case of the system tool dedicated to experimental results, such type of interpretation (or oracle's capacity) may be delegated to a growing set of oracles available within or through the system as soon as integrated or addressed or parametered by Semantic Oracles. This is due to the fact that only an Semantic oracle has the capacity to choose or build an oracle of more restricted capacity, in other words of a lesser complexity level.

It is important to emphasize the fact that this possibility is intrinsically dependent upon the system purpose and process, which deal with experimental result, hence often physical or technical signal received and treated, which may come directly from sensors or instruments as well as be selected and imported by scientists themselves. This is inasmuch as the objects of the research fields or 'clusters' considered are themselves physical, or chemical or biological or more generally 'environmental' in the system's process. This would not be the case for semantic judgments, deciding upon data only interpretable by semantic oracles, such as most of the information processed by computers (a difficulty for the semantic web for instance).

The source of the technical oracles are initially semantic oracles and the system own researchers as well but there will be then a growing collection made available for other researchers and other disciplines.

An example of signal is for example a light ray, which is already structured when it comes from a laser emitter such as laser diode as used for fiber optics signal but as well information transmission. This shows that information carries a concept of structuration or categorization level as well as spatially, in a signal or information processing. This is another typical example where the oracle interpreting said signal may be of technical nature when there is no meaning associated with this categorization (because it comes from a physical or chemical or biological or environmental source for instance)".

One or several part of the method may be automated with technical oracles 41 related to computer program items that include program instructions to be processed by computer based device as programmed by the user or the data processor 17.

They are prepared, enriched and increased by the user through level 'B' of the method.

It is known to those skilled in the art that an oracle is used in the computer scientific literature as a tool capable of instantaneous acceptability, that is to say including a device with a set of answers in order for the computer or automaton immediately to compare a string to the elements of this sets rather than recursively to re-produce them.

A technical oracle 41 is an agent capable of deciding either a common meaning or triggering local adaptations in a technical context that it is capable of resolving quite instantaneously.

It is an automaton that may learn progressively from both the user and from its own physical resources and access to external instrumentation.

A technical oracle has a technical categorizing capability. As a physical component it processes related automated operations.

It is capable of conveying and even deciding sets of experiments.

The conveying capacity is linked to a formal model introduced by the user through the path (107) and the decidability, which is the properly technical capacity, depends from the type of physical oracle used.

More precisely, some technical oracles prepared by the user may receive pre-aggregated results and then interpreted them to allow the system 10 to test and evaluate a number of laws for the experimental research project of the user compared to the environment in its cluster.

These technical oracles interact with oracles shown in FIG. 2 previously entered to accept or reject certain assumptions based on changes in the experimental research project results and statuses already decided by oracles resulting from previous steps.

The technical oracles and oracles mixes may provide a cluster of relevant experimental research projects (through path 108) with feedbacks based on changes in status and position of results of experimental research projects of competing or complementary models.

Or, they may act on the instrumentation device to modify the distribution of the parameters and measured data (through path 31).

In another embodiment, a technical oracle 41 may be a software component to compute a function.

It may start with a simple and related data clustering, acting as an oracle as it accepts or rejects successive data for belonging a predefined cluster or sub cluster.

Such accepting component or function checking, is available but not may be considered as more mathematical or formal, yet directly selected, parametered or embedded by any participating semantic oracle, than properly technical.

As an example of software component, a technical oracle 41 may directly trigger or even pilot the instrumentation device (through path 31).

As described, the technical oracles may perform various computer-implemented operations associated with at least one of the following tasks, on behalf of the user.

obtaining data from data acquisition system or instrumentation device to register them in the server to submit a project or update a project (as shown in FIG. 2, step 30);
submitting real to implemented experimental results to the content server 15 and update them;
creating a cluster;
linking experiments, subclusters and/or clusters together;
selecting data of a experimental research project and the display mode of clusters;
outputting selected data form the content server 15, such as sorting of experimental research projects data to retrieve data related to experimental research project with same or complementary degree of accomplishment;
generating a representation of pertinent experimental research project of a cluster(s) providing the evolution over time of a cluster or sub cluster or crosslinked clusters;
according to this representation, submitting or not new real to implemented experimental results to the content server 15 to be processed to generate a new representation by the data processor 17 or the technical oracle himself. The technical oracle 41 acts then according to a change in experimental context and/or in function of a set of preprogrammed instructions and constraints.

About the specific oracle's analyzer 40, it is adapted to realize the clustering.

The aggregation, in the specific oracle's analyzer, corresponds to specifically system's clusters and clustering process, whether sub clustering (such as partitioning) or meta-clustering, which is what requires oracles' capacities: aggregating is clustering upward, requiring a choice more complex than downward. Here the issue is optimal categorizing or clustering of research targeted to achieved and measured results rather than pilot a particular set of experiments, although such feedback is possible along the 111→113 path.

Examples of clustering use statistical methods or distances in order to produce or reveal intermediate clusters. Optimization and pattern recognition devices and functions are regularly improved and added directly from semantic oracles (path 40). The specific (to the system process) oracle will interpret the types of phase transitions defined as coalescence, precipitation, etc. in the general description.

A linkage may also be established between a demand from a type of semantic oracles rather market or industrial or researcher even though the signals and data conveyed through the path 4 from measurement instruments is scientific in nature: during the movements from shaping (mainly from the semantic oracle) to real and more particularly implementing and achieved in the case of experimental feed back, the 'achieved' arrival point may be aggregated in relation to such demands as long as sufficiently technical and lower level. This brings one of the numerous technical paths going to contribute to the interdisciplinary types of links technically produced by the system process.

Clustering means that it is adapted to sub-categorizing data of experimental research projects or it based on agglomerative algorithms, which have some capacity to aggregate results into clusters but based upon preset preferences among previously set selection functions from the user through paths 107 and from theoretical models through path 109 entered by the user in path 110.

The specific oracle's analyzer 40 gets cluster data through path 111 from a cluster display, combines said instructions with the ones of paths 109 and 107 and conveys preferences into both the analyzer 42 through path 112 and technical oracles 41 through path 113.

In the first case (path 112 to Analyzer) collective behaviors in the cluster are detected and analyzed.

In the second case, the specific oracle's analyzer 40 calls for technical oracles 41 to draw trajectories of the cluster.

On the contrary of the first case, the results are synthesized (rather than analyzed) by the specific oracle's analyzer 40, and namely clustered.

They impact the technical oracles 41 parametered or even defined by the user, such as functions or sets of acceptable results and measurement instructions, especially toward path 31 and the decision associated to modify the distribution of the parameters and measured data of the user's experimental research project.

In an example, the specific oracle's analyzer 40 is prepared by the system 10 especially through different clustering algorithms including the list of transformations like precipitation, coalescence, fusion and taking into account the common goals for the cluster (through path 107):

Moreover, the new experimental results submitted are then processed by the data processor 17 in order to project the evolution of the cluster or sub cluster by displaying the displacement of the experimental results and their transition over time.

What is denoted as 'transition' corresponds to the major shift from one result status to the next.

The data processor 17 provides the analyzer 42 to do so.

The analyzer transfers from path 112 and displays through path 114 the transformation and dynamics of one or several clusters by also integrating technical oracles 41 (from users) through path 115, whether mixed.

It also takes into account independent cluster data coming from path the content server 15 through path 116.

Its algorithms include both a set of functions and also methods or parameters coming through the path 117 comprising specific models related to some specific cluster and corresponding tools entered by path 110 by the user.

It is important to emphasize again the difference between analyzer, allowing sub-clustering (usually partitioning), and oracles, which have the rare capacity of deciding an agglomerative clustering, in other words synthesizing.

The analyzer 42 may analyze a graphical or analytic transformation by performing, for example, the following functions to study the behavior of a cluster or sub cluster, namely:

study of the barycenter movements, asymptotic trend, speed acceleration or changes of axis of transition of the clusters, study of the inputs/outputs, convergence, coalescence, a standard deviation or variance i.e. statistical studies of data, etc. . . . .

Also illustrated in FIG. 2, the experimental research project data (path 118) stored in the content server 15 from the instrumentation device 19 are stored with or without value added or transformation from similar or complementary sets, such as influenced or treated through path 108 wherein the technical oracles 41 have decidability capacity for displays of clusters as well as it has for the instrumentation device 19 that fall within their reach and through path 114 from the analyzer 42.

One of the sources of experimental research project data going to the display and then into the content server 15 is directly from "selected" experimental results coming through path 118, while another source comes from Experimental Results tentative predictive formula, for instance in case of results with the status 'shaping' entered through path 110 by the user However such "selection" itself requires a selection device, which has impacted the instrumentation device by integrating selection parameters directly coming from:

the user's through 119 into the technical oracles 41.

Specific oracle's analyzer 40 through path 113 transferred a) either to technical oracles 41, capable of some level of pre-selection according to the user parameters (or even of technical oracles definitions), or b) to the users themselves through paths 112 and 120.

The path 120 defines the step wherein a user may set triggers by using technical oracle 41 that will warn him when significant movement of the cluster appears, being a sign of a possible new step in research and potential for new applications.

An action from the user may be then necessary through paths 107, 31 and/or 108.

These feedbacks to the members within a shared cluster about the evolution of the cluster and its sub clusters over time are transmitted to authorized observers through path 121 and to the user through path 121.

As described with the FIG. 2, the method of the invention gathers, process, aggregate and display experimental research projects and identifies trends going from disciplinary towards interdisciplinary developments.

The method may be an entirely automatable process through feedbacks from the technical oracles 41 and analyzer 40,42, taking into account the coalescence effects and the trends analysis up to condensation and precipitation signals which some examples are illustrated in the following figures.

The evolution of the cluster is observed on the user interface 12.

A user may observe different phase transitions of the cluster or subcluster as the following to appreciate the degree of advancement of a discipline, a research, a technical field or a component delimited by the observed cluster.

A cluster or set of subcluster (if observed across several clusters) is said to 'condensate' if the number of 'shaping' experiments falls abruptly relatively to 'real' and 'implementing'.

It is said to 'precipitate' if furthermore the number of 'real' experiments is falling abruptly.

It is said 'valid' if finally the number of 'implementing experiments itself falls and most of its experiments become 'achieved'.

FIG. 18 illustrates two trends corresponding to two emerging schools or directions of research within a cluster.

FIG. 19 illustrate some examples of movement of a cluster or sub cluster that permit to analysis trends.

The first one (FIG. 19*a*) shows a densification but slowing space of the cluster, the next one (FIG. 19*b*) shows a separation of the cluster or sub cluster into two sub groups.

FIG. 19*c* illustrates a dispersion of the cluster or sub cluster meaning that no clear trend appears unlike the following FIG. 19*d* in which a concentration of the experimental research projects reveal a clear trend.

In a next step, the data processor 17 may output from the content server 15 results from cross linked clusters and generate a common representation of these results derived from experiments from cross linked clusters.

This offers the opportunity to study interdisciplinary of research fields. The interdisciplinary may be defined as:

an interdisciplinary client—supplier through an upstream-downstream relationship between two levels of status and for example, between a status b and a status, an interdisciplinary internal to a cluster, a transdisciplinary research between clusters of complementary theorical fields and pluridisciplinary research between intertwining clusters of scientific and technological fields towards a common applied research or prototype.

an interdisciplinary according to categorizing capabilities depending on oracles learning along past targets with the interdisciplinary issue of production of oracles of sufficient power, An interdisciplinary using the hypercube of the display i.e. surfing throughout the display by changing dimensions, resolution or even categories for example.

The analysis of experimental results from cross linked clusters help users from diverse fields to see how their experimental research project fares among others projects to cooperate and to advance their project.

They provide for clusters which circumvents a discipline to be integrated for better knowledge or for clusters which tests a discipline for instance as a technology or component to be integrated with others for more solid structures.

Interdisciplinary offers also a way to reveal hidden trends.

The cross link between cluster may be defined from a diversity of ways, as for example, the following ones:

Clusters which have the same members;

Clusters which share the same measurements units and/or range;

Clusters which have lexical and measure unit proximities;

Clusters which have overlapping experimental results;

Complementary clusters delimiting what is around a central cluster, such as, the components used in the central cluster or the fields of science necessary to study for the central cluster.

The server offers also means to build and use an interdisciplinary interactive network.

Through the interdisciplinary network, you will be able to contact members of cross linked clusters who work on projects that could be connected to yours similarly to the social network tools which have been described in connection with the communication between cluster members and with similar benefits.

In a next step, a representation of the evolution of cross linked clusters over time may also be generated and projected to one or more members of these clusters in a similar way as a cluster evolution over time and with similar benefits.

FIG. 20 illustrates a graph of actual displacements of different subclusters observed across several clusters with status of results represented from 'shaping' to 'achieved'.

It shows that interdisciplinary links, a network of interacting fields—and even potentially interacting ones may be drawn as bubbles, each of which shapes are related to their faring over time alone and in the network.

The shape of the sub clusters is represented as a film of past and current expected results.

Shown, for example, is a division over time of a sub cluster into two separate sub clusters moving in two different directions.

In others embodiments, it may itself be decomposed in various types of film such as the film of shaping experiments, or real experiments, or implementing or achieved experiments, but also the film of transition such as 'shaping' to 'real' or 'real' to 'implementing' or 'implementing' to 'achieved'.

Figure 21:
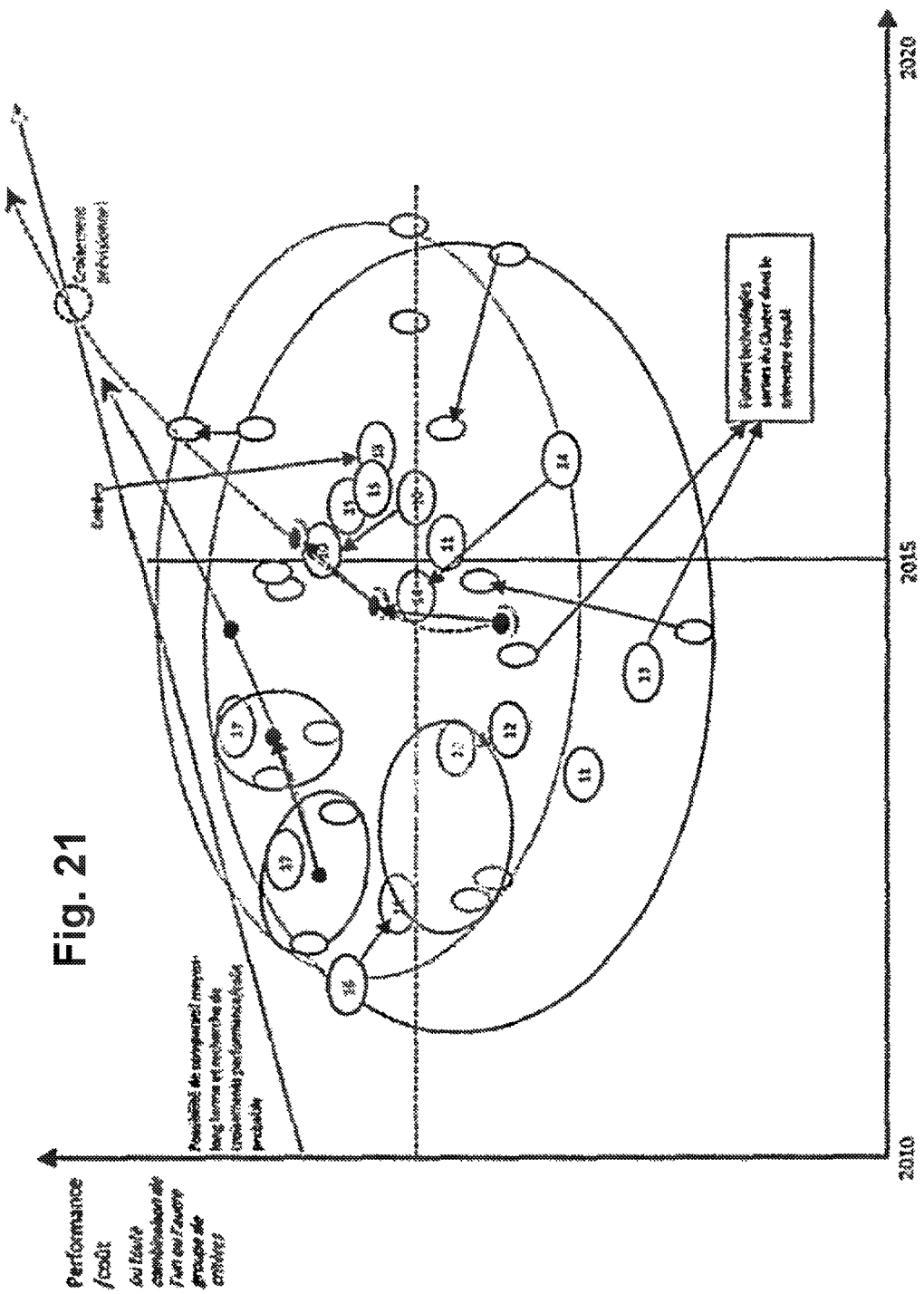
FIG. 21 illustrates a representation of several intertwining clusters evolution over a time period.

FIG. 21 shows clusters of experimental research projects with real status emerging.

Figure 22:
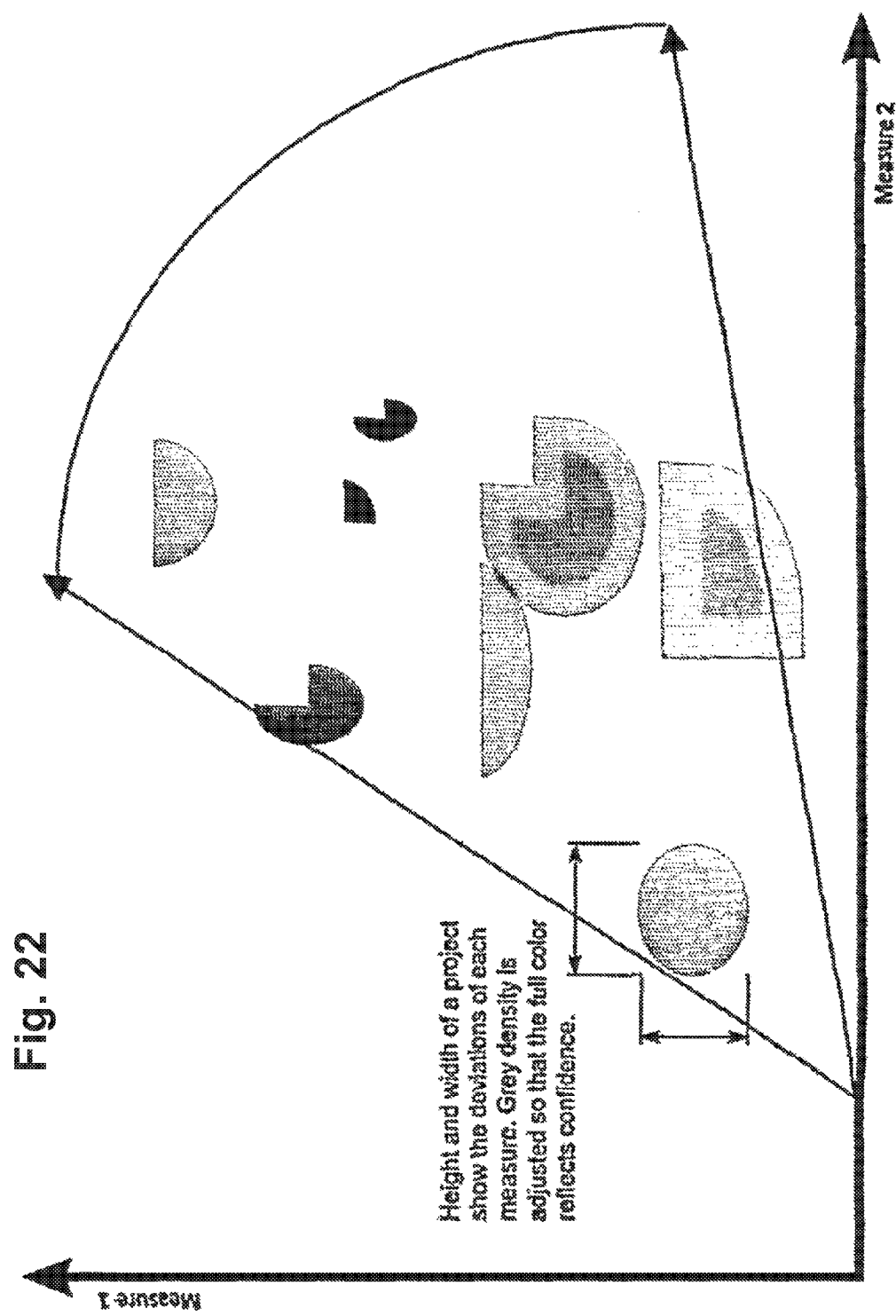
FIG. 22 is another display mode of relative positioning of experimental research projects data with their status.

FIG. 22 illustrates another type of picture and dynamics either per clusters or group of clusters appears. It will be even more clearer whether a research field emerges with consistency, growing confidence into predictability power, some case of precipitation confirming the heuristic value of the incoming cluster or its resilience.

A second set of operations, denoted (D, E, F), may use the same pattern [Shaping, Real, Implementing, Achieved], complemented by a 'Published' fifth level as detailed for C level and for instance respectively represented by quarter, half, three quarters and full pie, the fifth level being for instance then represented by a radiating pie.

While the pattern for the 'Experimental' "C" step was (C1, 'Shaping' with targeted results—whether from mostly theoretical based or mostly intentional anticipated future observational result—C2 'Real' with describable and potentially patentable protocol and design, C3 with implementing, hence horizon linked to budget, C3 'Achieved' with at least one measurement observed and C5 with 'Published', which assumes some recognition, such as peered, hence sufficient replication), the generalized pattern to complementary Duplication/Costing and Economy/Market steps are as follows:

D0 (equivalent to D5, 'Published') for publicly available costing as component public price assuming a generalized and potentially infinite duplicability (replicable ability) at similar measure or performance within confidence interval.

D1 (Lab proven), corresponds to a similar 'Shaping' cost, which comes from either theoretical based or anticipated (on semantic oracle previous experience for instance) shape of cost level, elaborated as the lab protocol and prototype is itself shaped, realized, implemented and achieved. As an example by conceiving and hand crafting a device simpler than usual, for instance with less material or less complex to fabricate or cheaper components or a more efficient and more capable set of components, the conceiver will shape a potentially more efficient duplication, hence manufacturing process, as a lower future cost.

It assumes a shaping fabrication, that is to say potential duplicated making.

D2 (Duplicated, external), correspond to a 'Real' cost which is, according to the same pattern as in 'C', dubbed real or realist inasmuch as the duplication is ascertained by quotation of some series by an external real actor, which therefore authors a cost design corresponding to this pre-industrial quote.

D3 (Duplicated/ordered), corresponds to an 'Implementing' cost, according to the pattern linked to a budget, that is to say an effectively launched manufacturing of some quantity, attested by an order and yielding a temporal horizon of availability of a future technology disposable at some verified cost.

D4 (Duplicated/fabricated) correspond to and 'Achieved' first production cost, hence after effectively observed and measured costs, all tests and final manufacturing process for this level of quantity being recorded.

D5 (Duplicated/public) corresponds to a 'Published' cost as a component or equipment, in any case replicate fabricated technology public price—within some confidence interval and measurement instrument dependent—and therefore industrialized and marketed.

The pattern is similarly used for the Market measurement

E0/E5 corresponds to existing markets, whether their sizes are measured with narrow or fuzzy confidence interval.

E1 corresponds to a 'Shaping' market, as anticipated by its target maker.

E2 corresponds to a 'Real' market, based upon external market maker evaluations, whether potential distributors or sets of order intentions.

E3 corresponds to an 'Implementing' market, upon which a distribution, even sample based, is being launched, hence with horizon for market measurement.

E4 corresponds to 'Achieved' market, that is to say with observable difference between expected and realized distributed quantity.

E5 corresponds to a 'Published' market inasmuch as there is recognition of some level of competition for satisfying similar performance requirements within its confidence interval, always partly community inter-subjective based.

It should be note that the extension of the pattern to these other dimensions is related to the proposed extension of a phenomenon measurement process conduct to generalized dimensionality, of which cost and market sizes participate.

The other elements of the Cluster pattern are also applied to these next steps of the general method according to the invention although each one may be processed independently.

In other words the method of a coalescent technology as described above, based upon a convergence of applied scientific experimental research projects with sufficiently defined design, replicated measured and shared intentionality towards a commonly purported axis of preferred or 'best' performance, is proposed applicable to coalescent and precipitating cost and similarly market.

The invention claimed is:
1. A scientific information management method implemented in a system comprising a server, and at least one content server connected to the server to provide networking services to a plurality of users interfaces through a network, said at least one content server comprising data including scientific information of experimental research projects, wherein the method comprises the following steps:
(a) submitting data comprising first scientific information to said at least one content server, said first scientific information being input together with a status identifying the degree of accomplishment of the experimental research project;

(b) retrieving said data from said at least one content server to be processed for generating at least one representation of the relative position of said first scientific information compared to other scientific information and the status of said first scientific information;

(c) transmitting said representation from said at least one content server to at least one user interface to display it on the user interface;

wherein said status is chosen among a discrete series of available statuses, including the following statuses:

shaping when said scientific information to be transmitted to said at least one content server relates to an experimental protocol that has been formulated but not yet designed;

real when said scientific information to be transmitted to said at least one content server relates to an experimental protocol that has been formulated and yet designed;

implementing when said scientific information to be transmitted to said at least one content server relates to an experimental set-up aiming at implementing an experimental protocol is available;

achieved when the scientific information to be transmitted to said at least one content server relates to experimental data issued from an experimental set-up; and published when the scientific information to be transmitted to said at least one content server relates to experimental data than have ever been published, and wherein said experimental research projects transition from one status to another status.

2. A method according to claim 1, wherein said scientific information comprises at least one measurement unit, or at least one dimension.

3. A method according to claim 1, wherein step (a) comprises a substep comprising inputting a piece of information concerning a cluster to which said first scientific information is to be related, said cluster being defined by a set of scientific information recognized by the users as targeting a common objective goal whatever the status of said scientific information.

4. A method according to claim 3, wherein said cluster is chosen among a plurality of existing clusters.

5. A method according to claim 1, wherein step (a) comprises a substep comprising creating a new cluster to which said first scientific information shall be associated with, a cluster being defined by a set of scientific information recognized as targeting a common objective goal by the users, whatever the status of this scientific information.

6. A method according to claim 1, wherein step (a) comprises a substep comprising inputting a computer program to be processed by the server during step (b) in order to output selected data from said at least one content server.

7. A method according to claim 6, wherein said computer program aims at selecting at least one of the following outputs from said at least one content server which has to be transmitted to the user during step (c), or a combination thereof:

an existence of experimental protocols, experimental set-ups or experimental data of the same type;

a set of scientific information recognized as targeting a common objective goal by the users whatever the status of these scientific information or a subset of these scientific information;

scientific information having a status of the same type;

the evolution over time of the relative position of said first scientific information compared to others scientific information;

an evolution over time of the relative position of said first scientific information compared to others scientific information and the evolution of their statuses;

a set of scientific information from crosslinked clusters whatever the status of these scientific information or, a subset of these scientific information, as a cluster is defined by a set of scientific information recognized as targeting a common objective goal by the users, whatever the status of these scientific information;

an evolution over time of crosslinked clusters.

8. A method according to claim 1, wherein step (a) is made by the user or in some cases, automatically.

9. A method according to claim 1, wherein step (b) comprises a substep comprising updating the scientific information available as soon as new scientific information related to previously scientific information represented is transmitted.

10. A method according to claim 9, wherein step (b) comprises a substep comprising generating a representation of the evolution over time of the scientific information and/or statuses transmitted by the users in a cluster.

11. A method according to claim 10, wherein said evolution relates to one of a displacement of the positioning of said scientific information in the representation.

12. A method according to claim 1, wherein step (b) comprises a substep comprising generating a representation of the evolution over time of related clusters.

13. A scientific information management system comprising a server, and at least one content server connected to the registration server to provide networking services to a plurality of users through a network, said at least one content server comprising data comprising scientific information of experimental research projects, wherein said system comprises:

a plurality of user interfaces, at least one of them comprising means for submitting data comprising first scientific information together with a status identifying the degree of accomplishment of said project;

a data processor connected to said plurality of user interfaces, said data processor being capable of processing said data retrieved from said at least one content server to generate at least one representation of the relative position of said first scientific information compared to other scientific information and the status of said first scientific information and display said representation on the user interface;

wherein said status is chosen among a discrete series of available statuses, including the following statuses:

shaping when said scientific information to be transmitted to said at least one content server relates to the design of an experimental protocol that has been formulated but not yet designed;

real when said scientific information to be transmitted to said at least one content server relates to an experimental protocol that has been formulated and yet designed;

implementing when said scientific information to be transmitted to said at least one content server relates to an experimental set-up aiming at implementing an experimental protocol is available;

achieved when the scientific information to be transmitted to said at least one content server relates to experimental data issued from an experimental set-up; and published when the scientific information to be transmitted to said at least one content server relates to experimental data than have ever been published, and wherein said experimental research projects transition from one status to another status.

14. A system according to claim 13, wherein said at least one content server is separated into clusters, a cluster being defined by a set of scientific information recognized by the users as targeting a similar goal whatever the status of said scientific information.

15. A system according to claim 13, wherein said scientific information comprises at least one measurement unit, or at least one dimension.

16. A system according to claim 13, wherein said user interfaces are computer-based systems connected to instrumentation device to provide scientific information automatically.

* * * * *